US012666020B2

(12) United States Patent
Taquet et al.

(10) Patent No.: US 12,666,020 B2
(45) Date of Patent: *Jun. 23, 2026

(54) CROSS-COMPONENT ADAPTIVE LOOP FILTER FOR CHROMA

(71) Applicant: CANON KABUSHIKI KAISHA, Tokyo (JP)

(72) Inventors: Jonathan Taquet, Talensac (FR); Christophe Gisquet, Acigne (FR); Guillaume Laroche, Saint Aubin d'Aubigné (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/908,573

(22) Filed: Oct. 7, 2024

(65) Prior Publication Data

US 2025/0097415 A1 Mar. 20, 2025

Related U.S. Application Data

(63) Continuation of application No. 17/636,806, filed as application No. PCT/EP2020/073122 on Aug. 18, 2020, now Pat. No. 12,177,426.

(30) Foreign Application Priority Data

Aug. 20, 2019 (GB) ..................................... 1911952

(51) Int. Cl.
H04N 19/80 (2014.01)
H04N 19/105 (2014.01)
(Continued)

(52) U.S. Cl.
CPC ......... *H04N 19/117* (2014.11); *H04N 19/105* (2014.11); *H04N 19/132* (2014.11); *H04N 19/184* (2014.11); *H04N 19/80* (2014.11)

(58) Field of Classification Search
None
See application file for complete search history.

(56) References Cited

U.S. PATENT DOCUMENTS

2013/0083844 A1 4/2013 Chong
2021/0076040 A1* 3/2021 Abe ...................... H04N 19/30

FOREIGN PATENT DOCUMENTS

CN 103891293 A 6/2014
WO 2014049981 A1 4/2014

OTHER PUBLICATIONS

Misra et al., "Cross-Component Adaptive Loop Filter for chroma," (hereafter Misra) (Year: 2019).*

(Continued)

*Primary Examiner* — Samuel D Fereja
(74) *Attorney, Agent, or Firm* — Canon U.S.A., Inc. IP Division

(57) ABSTRACT

A method of filtering an image is disclosed, the method comprising: receiving filter coefficients and first component sample values corresponding to samples surrounding a reference sample, and inputting said filter coefficients and first component sample values into a cross component filter to produce a cross component filter output; wherein said cross-component filter uses a restricted number of bits to represent said filter coefficients and/or first component sample values to produce said filter output.

17 Claims, 16 Drawing Sheets

(51) Int. Cl.
  *H04N 19/117*    (2014.01)
  *H04N 19/132*    (2014.01)
  *H04N 19/184*    (2014.01)

(56)            References Cited

OTHER PUBLICATIONS

Zhou Yun, et al., Study on the Development of Video Coding Standard VVC, Content Production & Broadcasting, China Academic Journal Electronic Publishing House, 2018.

* cited by examiner

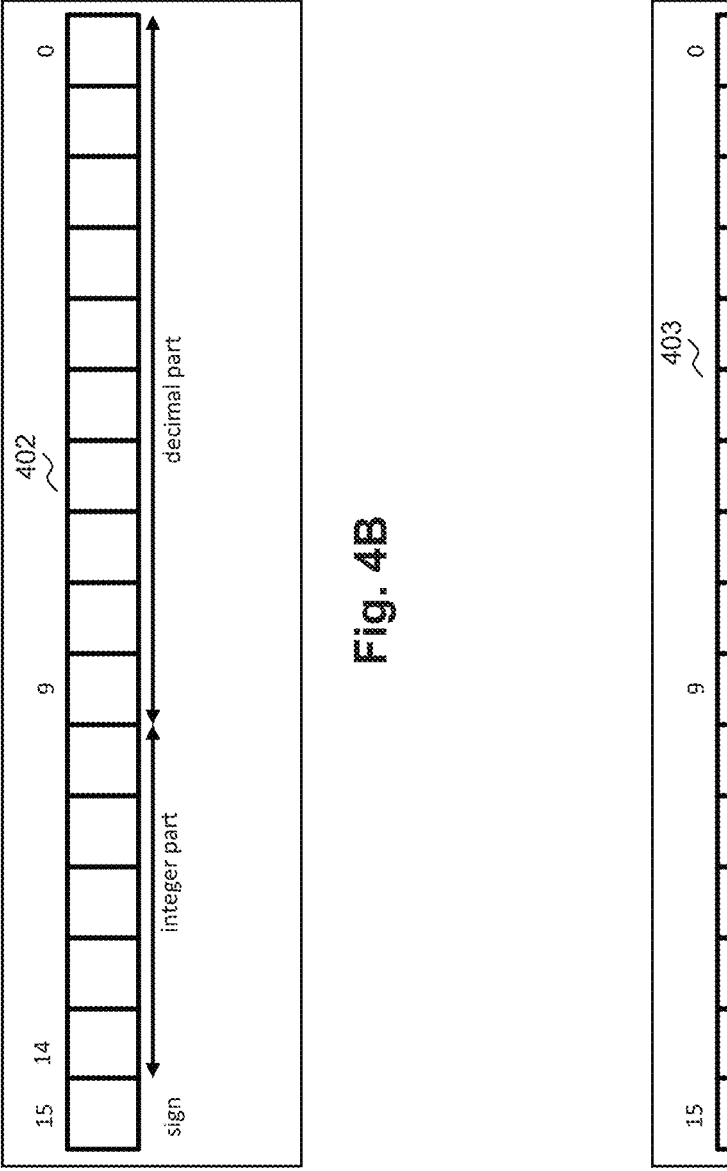
Fig. 4B
Fig. 4A
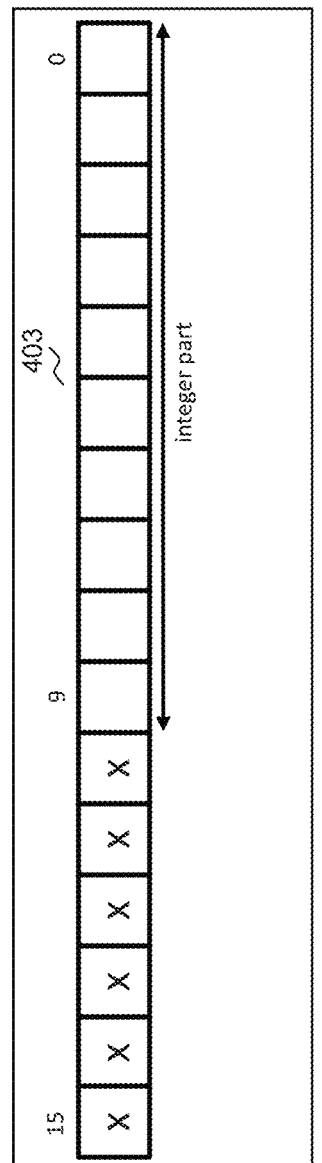
Fig. 4C

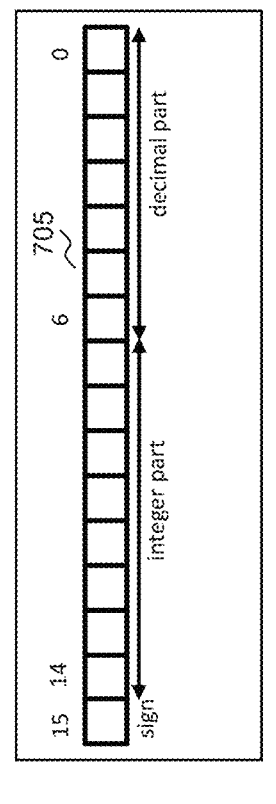
Fig. 7A
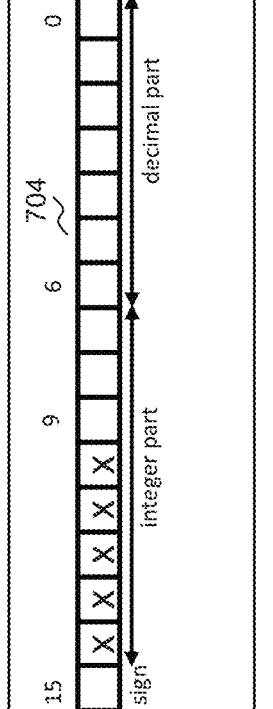
Fig. 7B
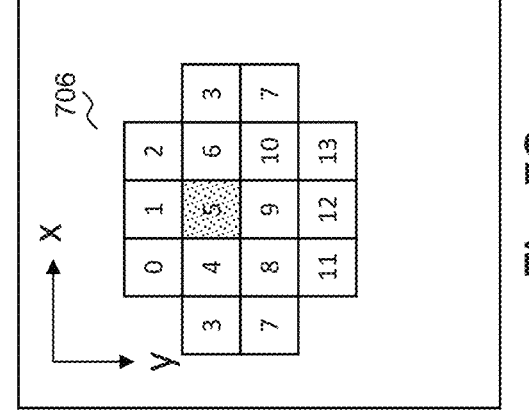
Fig. 7C
Fig. 7D

CROSS-COMPONENT ADAPTIVE LOOP FILTER FOR CHROMA

CROSS REFERENCE TO RELATED APPLICATION

This application is a continuation of U.S. application Ser. No. 17/636,806, filed on Feb. 18, 2022, which is the National Phase application of PCT Application No. PCT/EP2020/073122, filed on Aug. 18, 2020. This application claims the benefit under 35 U.S.C. § 119(a)-(d) of United Kingdom Patent Application No. 1911952.8, filed on Aug. 20, 2019. The above cited patent applications are incorporated herein by reference in their entirety.

FIELD OF INVENTION

The present invention relates to encoding or decoding of blocks of a video component. Embodiments of the invention find particular, but not exclusive, use when controlling a filter for filtering samples of such component. In particular, but not exclusively, controlling an adaptive loop filter.

BACKGROUND

Video coding includes image coding (an image is equivalent to a single frame of a video). In video coding, some coding tools such as a quantization of transform coefficients or motion compensation (which is often performed using interpolation filters) often introduce distortion biases/effects (distortions that seem systematic or at least that are not random in a given context). In order to compensate for those biases/artefacts, and to improve (or at least maintain a good level of) coding efficiency some specific coding tools, called post-filters or in-loop filters, are used. A Deblocking filter (DBF), a sample adaptive offset (SAO) filter or an adaptive loop filter (ALF) are some examples of such coding tools. In-loop filters are applied within a coding loop so that the image quality increase they provide for a current frame enables an increased coding efficiency for subsequent frames which are coded based on the current one. For instance, quantisation of DCT coefficients is efficient for video compression but it often introduces blocking artefacts (biases) on the boundaries of compressed blocks of samples. The Deblocking filter reduces undesirable effects arising from such artefacts. Deblocking (using the DBF) a decoded frame within the coding loop (before it serves as a reference frame for the motion compensation for another frame) increases the coding efficiency of motion compensation significantly compared to deblocking the frame out of the coding loop (e.g. just before displaying it for instance).

The present invention relates particularly to the adaptive loop filter (ALF), which is also applied as an in-loop filter to reduce undesirable compression artefacts in decoded frames/images. ALF has been studied by the Video Coding Experts Group/Moving Picture Experts Group (VCEG/MPEG) standardisation groups, and it is being considered for use in the Versatile Video Coding (VVC) standard, for example in the fifth version of the VVC Test Model software (VTM-5.0 or VVC Draft version 5). Cross Component ALF (CCALF) was suggested in JVET-O0636, Joint Video Experts Team (JVET), 15th Meeting: Gothenburg, SE, 3-12 Jul. 2019, which is a supplementary filter for ALF, which uses sample values of the Luma channel to estimate an additional error correction of the artefacts made on the sample values of a Chroma channel. CCALF may be applied on each Chroma channel.

SUMMARY OF THE INVENTION

The present invention relates to improving the coding performance of a portion of the CCALF process by simplifying the cross-component filter.

Embodiments of the invention relates to using a reduced bitdepth representation (compared to an internal bitdepth) of either or both of the filter coefficients or the cross-component input samples. This restricting may be performed by a bitshift operation and/or ignoring certain bits of the filter coefficients/input samples.

In one aspect of the present invention there is provided a method of filtering an image portion, the method comprising: receiving filter coefficients and first component sample values corresponding to samples surrounding a reference sample, and inputting said filter coefficients and first component sample values into a cross component filter to produce a cross component filter output; wherein said cross-component filter uses a restricted number of bits to represent said filter coefficients and/or first component sample values to produce said filter output.

In such a way, the filter calculation is simplified and the majority of the CCALF coding improvement is surprisingly maintained.

Optionally, said restricted number of bits is lower than the number of bits defined by an internal bitdepth.

For efficient implementation, said restricted number of bits to represent said filter coefficients and/or first component sample values is so that the filter output can be represented on 16 or fewer bits.

Optionally, the method further comprises combining said cross component filter output with an output of a filter corresponding to a different component. Optionally, said first component is Luma and the different component is a Chroma component.

For efficient implementation, the method comprises performing a bit shift operation so as to reduce the number of bits prior to a filter multiplication operation. This allows for a simplified filter calculation.

Restricting Sample Values

In one aspect of the present invention, the number of bits used to represent sample values is reduced.

Optionally, according to a third variant, the restricting comprises reducing the precision of the sample value by only considering certain bits.

Optionally, a predefined number of lowest bits are ignored; for example the lowest bit, the lowest 2 bits, the lowest 3 bits or the lowest 4 bits.

Optionally, a predefined number of highest bits are kept; for example the highest 8, 7, 6, 5 or 4 bits.

For further simplification, the method may comprise rounding the sample value using the highest removed bit.

Optionally, according to a fourth variant, inputting the sample values into said filter comprises inputting a figure representing a difference in values of said first component sample value and a reference sample value.

Optionally, the method further comprises clipping said difference based on a clipping function defined by fixed clipping parameter C.

The clipping function K may be represented by:

$$K(d, C) = \max(-C, \min(C, d))$$

where C is a clipping parameter and d is the figure representing the difference. Thus the inputs to the clipping function are the figure representing the difference and the clipping parameter, and the output is the highest value of-C or the smaller value between C and d.

In one advantageous embodiment C is $2^{(IBitDepth-n)}-1$, where IBitDepth is the number of bits used to represent the sample values and n is an integer satisfying n<IBitDepth. Optionally, n=2 or 3.

Restricting Coefficient values

In one aspect of the present invention, the number of bits used to represent filter coefficient values is reduced.

Optionally, according to a second variant, the restricting comprises limiting the range of the possible values of filter coefficients. This allows the coefficients to be represented on fewer bits and makes the subsequent calculations simpler.

Optionally, according to a first variant said restricting comprises using a reduced fixed-point decimal precision of the input coefficient value.

Embodiments with particular advantages include where the reduced fixed-point decimal precision is one of 8, 7, or 6 bits.

In one optional embodiment, limiting the range comprises not using any bit higher than a threshold; for example the threshold is the $7^{th}$, the $6^{th}$, the $5^{th}$, the $4^{th}$ or the $3^{rd}$ bit of fixed point decimal precision.

In one advantageous implementation of the invention, each multiplication is replaced by bitwise shift and addition operations-these being simpler to implement in both hardware and software. As such the filter operation may comprise a multiplication of sample values and a filter coefficient, and said multiplication is implemented via a bitwise shift and/or combination with another filter coefficient so as to replace said multiplication operation by bitwise shift and addition operations.

Filter Shape

In another aspect of the present invention, modifications to the shape of the filter are proposed. Such modifications include reducing the number of samples to be considered (and thus simplifying the resultant calculations) while maintaining the gains provided by CCALF.

Optionally, each first component sample value is a sample value at a position at a defined position relative to a reference sample, the position of the sample being defined by a filter shape.

For ease of implementation, the filter shape is so that it contains 16 or fewer samples.

In one embodiment, the filter shape comprises a pattern where said first component sample has a position (x+u, y+v) relative to said reference sample where u and v belong to [−2,2] integer interval.

In another embodiment, the filter shape comprises a pattern where every sample has a position (x+u, y+v) relative to said reference sample where u belongs to [−2,2] and v belongs to [−1,2]. In a variant, the filter is 'diamond-shaped'; for example where v belongs to [0,1] when |u|=2.

In one embodiment, the filter shape comprises a pattern where every sample has a position (x+u, y+v) relative to said reference sample where u belongs to [−1,1] and v belongs to [−1,2]. In a variant, the filter is 'diamond-shaped'; for example where v belongs to [0,1] when |u|=1.

In another embodiment, the filter shape comprises a pattern where every sample has a position (x+u, y+v) relative to said reference sample where u,v belongs to [0,1].

Signalling

Embodiments of the invention also relate to signalling CCALF filter coefficients in the bitstream. It is an aim of the present invention to improve signalling so as to minimise the bitrate cost associated with CCALF.

Optionally, the method further comprises signalling in the bitstream the reduced number of bits for said filter coefficient and/or sample values. This allows for consistent treatment of different images, and allows for flexibility in processing if required.

According to one aspect of the present invention the method further comprises: determining if cross-component adaptive loop filter (CCALF) is indicated for a given component; and decoding/or encoding said filter coefficients from a bitstream.

According to another aspect of the present invention there is provided a method of decoding an image portion encoded using CCALF, the method comprising: determining if CCALF is indicated for a given component; decoding CCALF coefficients from a bitstream; and decoding said image portion using said CCALF coefficients; wherein said CCALF coefficients are encoded into the bitstream without a prefix.

This aspect represents a simplification over the prior art, and results in a lower bitrate without a significant compromise in CCALF performance—particularly when combined with the reducing the number of bits used to represent the filter coefficients as described herein.

Optionally, determining if CCALF is indicated for a given component comprises decoding a flag.

According to another aspect of the present invention there is provided a method of encoding an image portion using cross-component adaptive loop filter (CCALF), the method comprising: determining if CCALF is indicated for a given component; encoding CCALF coefficients into the bitstream; and encoding said image portion using said CCALF coefficients; wherein said CCALF coefficients are encoded into the slice header using a fixed representation.

Optionally, said determining if CCALF is indicated for a given component comprises encoding a flag into said slice header.

In a first alternative, for ease of implementation, the CCALF coefficients may be directly encoded in the slice header.

The CCALF coefficients may be encoded in the bitstream using signed unary coding. Such a coding scheme is simple to encode and decode and does not rely on other parameters (e.g. a prefix) to do so.

Optionally, according to a third alternative, the signed unary coding comprises: a bit indicating the sign of the coefficient; and a series of bits equal to one indicating the amplitude of the coefficient.

Optionally, according to a second alternative, the signed unary coding comprises: a first bit in the bitstream indicating if the coefficient is zero or not, if the coefficient is not zero; a bit indicating the sign of the coefficient, and a sequence of bits equal to one indicating the amplitude of the coefficient.

Optionally, the first bit being equal to one indicates that the coefficient is zero.

Optionally, the sign bit equal to one indicates that the coefficient is negative.

Optionally, for ease of parsing, the signed unary coding further comprises a bit equal to zero at the end of the sequence indicating the end of the signalling of the coefficient.

Yet further aspects of the present invention relate to a device for filtering an image.

Yet further aspects of the present invention relate to an encoder and a decoder.

Yet further aspects of the present invention relate to a program. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Further features of the invention are characterized by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

BRIEF DESCRIPTION OF THE DRAWINGS

Embodiments of the invention will now be described, by way of example only, and with reference to the following drawings in which:

FIG. 4A provides a filter shape and coefficient arrangement for a CCALF filter according to an embodiment of the invention;

FIG. 4B shows a typical bitwise memory representation of a CCALF filter coefficients;

FIG. 4C shows a typical bitwise memory representation of the sample values used during CCALF filtering with a 10-bits internal bitdepth;

FIG. 7A shows a typical bitwise memory representation of the output of a multiplication of a CCALF filter coefficient with a sample value while performing CCALF filtering according to variants of the invention;

FIG. 7B shows a typical bitwise memory representation of the output of the addition operations performed for summing the results of the multiplications of CCALF filter coefficients with sample values while performing CCALF filtering according to variants of the invention;

FIG. 7C provides a filter shape and coefficient arrangement for an example of CCALF filter using 16 samples to reduce the number of bits and operations used in CCALF filtering process according to a fifth variant of the invention;

FIG. 7D provides a filter shape and coefficient arrangement for an example of CCALF filter using 16 samples to reduce the number of bits and operations used in CCALF filtering process according to a fifth variant of the invention;

DETAILED DESCRIPTION

Embodiments of the present invention described below relate to improving encoding and decoding of images.

In this specification "signalling" may refer to inserting into (providing/including/encoding in), or extracting/obtaining (decoding) from, a bitstream information about one or more parameters for controlling a filter, for example use, disuse, enabling, or disabling of a mode/scheme or other filter control related information.

It this specification, the term "slice" is used as example of an image portion (other examples of such an image portion would be a tile or a tile group, which is a group/set of tile(s)). It is understood that embodiments of the invention may also be implemented based on an image portion (e.g. a tile or a tile group), instead of a slice, and an appropriately modified parameter/value/syntax such as a header for the image portion/tile/tile group (instead of a slice header), a type of an image portion/tile/tile group (instead of a slice type), and statistics for an image portion/tile/tile group (instead of slice statistics). It is also understood that an adaptation parameter set (APS) or a tile (group) header may also be used to signal ALF or CCALF parameters (or information for using (CC) ALF filtering), instead of a slice header or a sequence parameter set (SPS). When APS is used for signalling the (CC) ALF parameters (or information for using (CC) ALF filtering), the slice header or the tile group header may be used to indicate which APS has to be used for obtaining the (CC) ALF parameters (or information for using (CC) ALF filtering), for example by indicating an adaption set identifier (aps_id). It is also understood that any of a slice, a tile group, a tile, a Coding Tree Unit (CTU)/Largest Coding Unit (LCU), a Coding Tree Block (CTB), a Coding Unit (CU), a Prediction Unit (PU), a Transform Unit (TU), or a block of pixels/samples may be referred to as an image portion.

It is also understood that: when a filter or a tool is described as "active", the filter/tool is "enabled" or "available for use" or "used"; when described as "inactive", the filter/tool is "disabled" or "unavailable for use" or "not used"; and a "class" refers to a group, grouping, category, or classification of one or more elements. Further, it is also understood that when a flag is described as "active" it means the flag indicates the relevant filter/tool is "active".

Adaptive Loop Filter (ALF)

Figure 1:
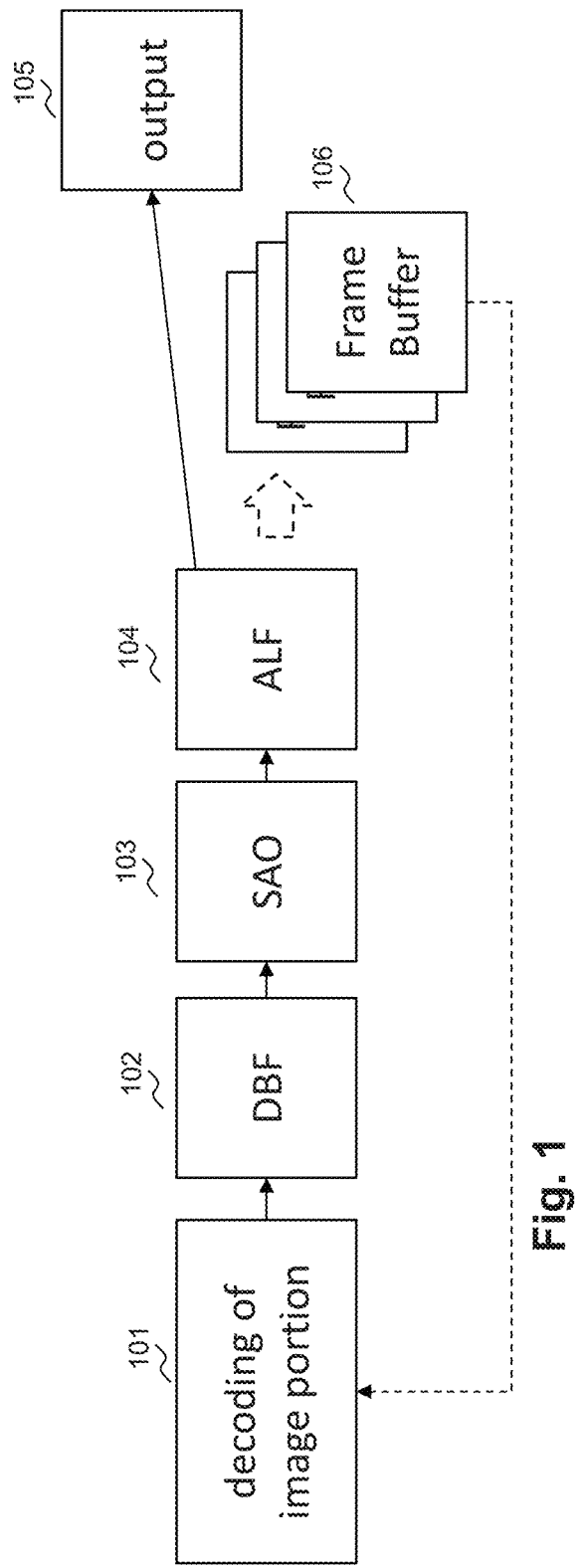
FIG. 1 shows where ALF takes place in a typical decoding loop of VTM-5.0.

FIG. 1 shows where ALF takes place in a typical decoding loop of VTM-5.0. In 101, an image portion (e.g. a slice) is decoded, in units of a coding tree unit (CTU: the largest coding unit in VVC, typically of 128×128 sample/pixel size). A CTU is split into rectangular blocks, or coding units (CU), that are encoded using a particular prediction scheme/mode and, often, a lossy encoding of a residual block. Due to use of the block based encoding, blocking artefacts may be visible at the boundaries between encoded blocks. In 102, the decoded image portion is then processed by the DBF to reduce/remove those artefacts. Typically, to encode the residual (block) for a block prediction, the residual values are transformed using a DCT-like transform (in order to compress the residual energy in a few coefficients), and the transformed coefficients are quantized to reduce the encoding cost. This quantization often introduces some ringing artefacts in reconstructed blocks (i.e. blocks in reference frames stored in the Frame Buffer 106). In 103, the output image portion of DBF is then processed by the SAO filter, which is useful in reducing some of these artefacts at a low computational cost. In 104, the output image portion of the SAO filter is then processed by the ALF. The ALF can further reduce artefacts like "ringing" for instance. The ALF has a higher order error modelling capability but it is at a higher computational cost. The output image portion of the ALF is then sent to an output (e.g. a display or a communication interface for communicating with the display) 105. It can also be put in a frame buffer 106 (as a portion of a reference frame stored therein) so that it can be used for temporal prediction (when temporal prediction tools are used). This is why DBF, SAO filter and ALF are called "in-loop" filters. An encoder may disable some of the in-loop filters so that at the decoding they may be bypassed (i.e. no filtering is performed and the output of a step corresponding to the disabled tool is the same as its input). Also, in some cases the image portion processed is not limited to a slice but may be a full frame containing one or multiple slices, with the possibility of applying the filters across the slice boundaries (if more than one present), to reduce the artefact on those boundaries. For multi-components images (e.g. an image in YCrCb format) the DBF, SAO filter or ALF processing are applied to each component individually, and possibly differently (e.g. using a different filtering parameter to the other component).

Figure 2:
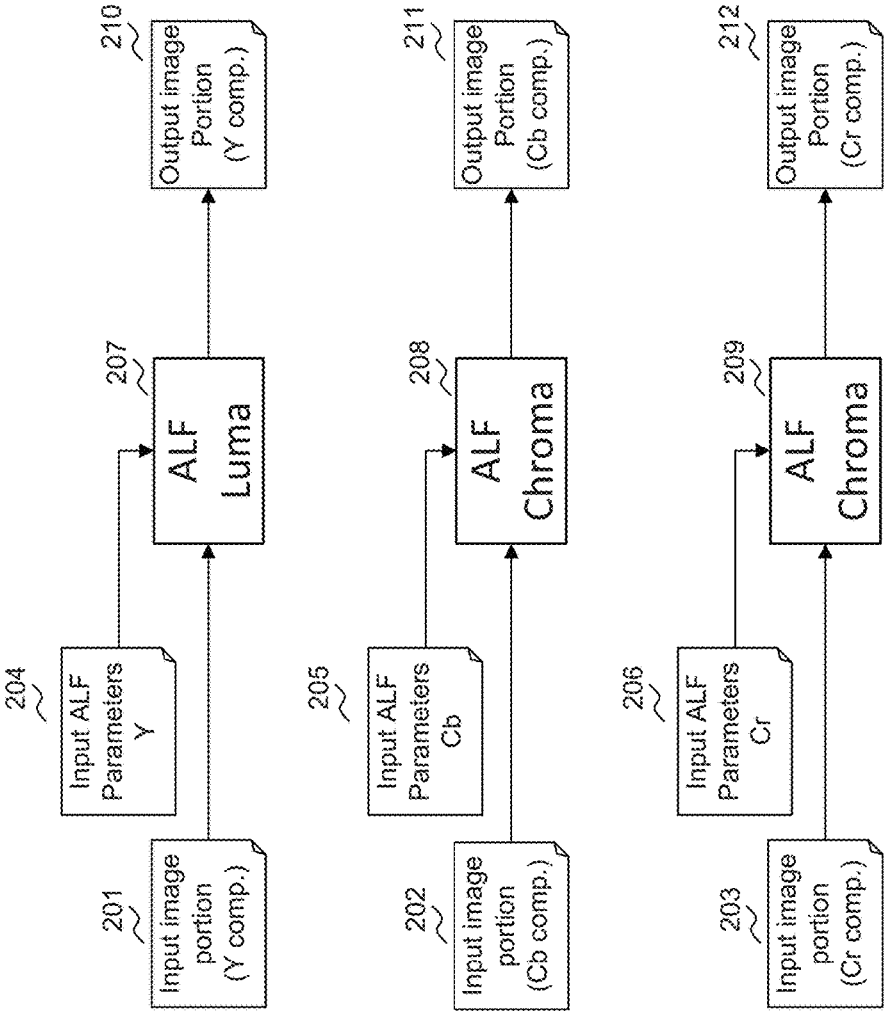
FIG. 2 is a flow chart providing an overview of the ALF filtering in VTM-5.0.

FIG. 2 provides an overview of the ALF filtering in VTM-5.0. For each channel (Luma channel: Y and Chroma channels: Cb and Cr), an input image portion 201, 202, 203 is provided together with filtering parameters 204, 205, 206 to an Adaptive Loop Filtering (ALF) process 207, 208, 209. The ALF processes generates a processed output image portion for each channel 210, 211, 212. ALF Chroma processing in 208, 209 is the same for both Chroma channels but it may be configured to work differently on each channel thanks to specific parameters provided in 205 and 206. ALF Luma processing performed in 207 is often more complex than ALF Chroma processing performed in 208. There are two reasons for this. The first one is that the Luma channel content is often more complex to process/encode than the Chroma channel, because Luma channels contain more structures (contours, textures, etc) than the Chroma channel which is often more smooth. The second reason is that the human eye is more sensitive to errors on the Luma channel than errors on the Chroma channels. Thus, more advanced and complex (i.e. more power consuming and/or slower) processing are preferred for the Luma channel in order to provide better coding gains and a better visual quality.

Input parameters information provided in 204, 205, and 206 are transmitted in Adaptation Parameter Set (APS) and/or in slice header. 204, 205, and 206 can also share some common information.

ALF processing 207, 208, 209 can be performed in parallel on each channel, as the tasks result of each one is independent of the task results of the other ones. Such opportunity for parallel processing can decrease the total time taken for processing and can be efficiently implemented in either hardware or software.

Input parameters information provided in 204, 205, and 206 may also include internal bit-depth information. Internal bit-depth is the maximum number of bits that can be used to represent sample values (i.e. it represents precision of the sample values). In VTM-5.0, it is permitted to use an internal bit-depth for the Luma channel that is different from the internal bit-depth for the Chroma channels (the bitdepth information is signalled in the sequence parameter set (SPS) for both channel types—Luma and Chroma). In the following description 'IBDL' will refer to internal bit-depth for Luma, 'IBDC' will refer to internal bit-depth for Chroma. When using 'IBD' for internal bit-depth, it means that IBDL is considered equal to IBDC. When not mentioned or not specified, the internal bit-depth does not affect the process being discussed, or has been omitted as the internal bit-depth(s) are handled in an orthodox manner.

Figure 3:
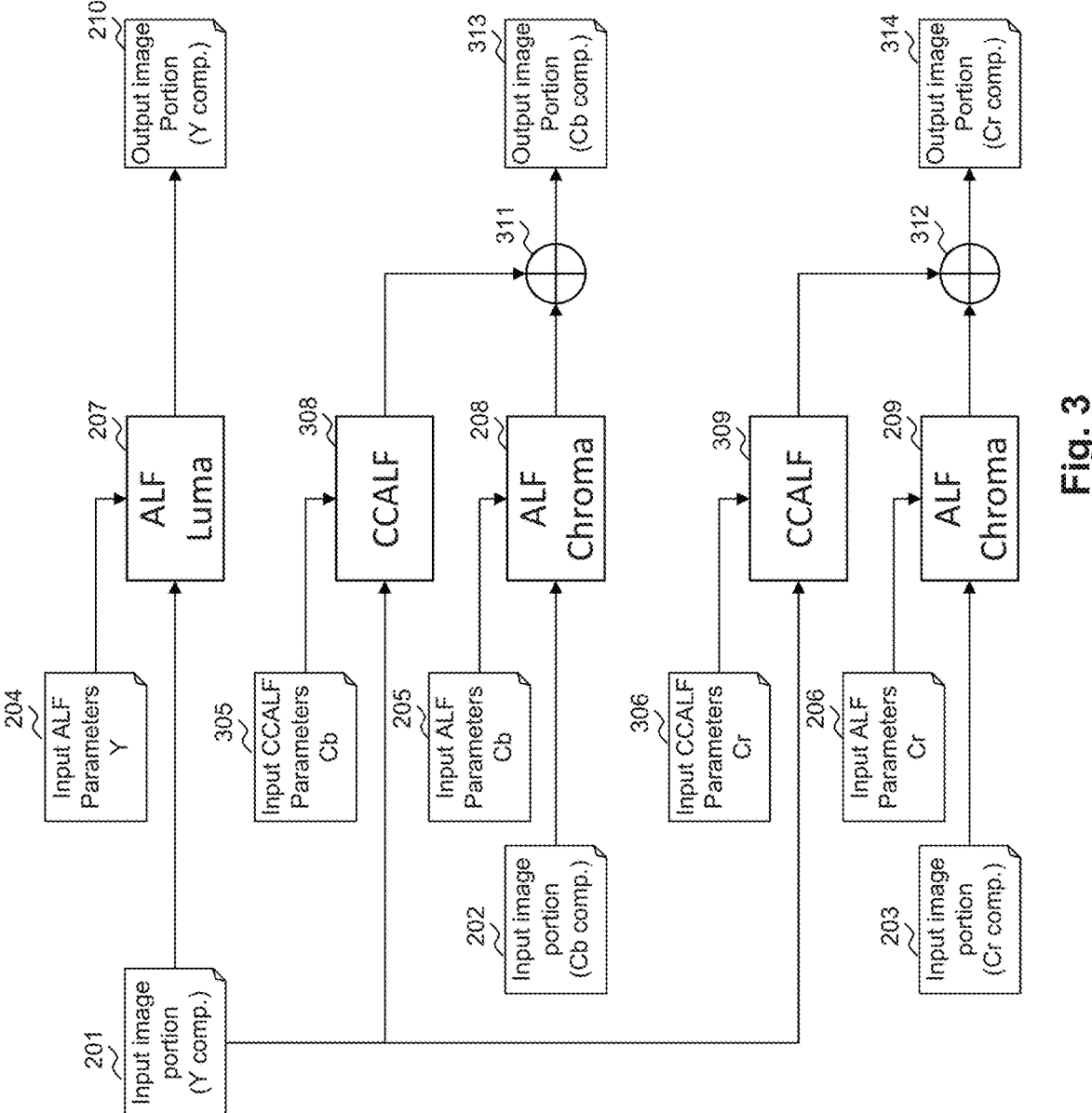
FIG. 3 is a flow chart providing an overview of the CCALF filtering in addition to ALF of VTM-5.0.

FIG. 3 provides and extension of ALF filtering in FIG. 2, to use Cross Component ALF (CCALF) processing.

For each Chroma channel 202, 203, the input image portion of the Luma channel 201 is provided together with filtering parameters 305, 306, to a Cross Component Adaptive Loop Filtering (CCALF) process 308, 309. The output of the CCALF filtering process is added in 311, 312 to the output of the ALF Chroma filtering process 208, 209 to generate for each Chroma channel a processed output image portion 313, 314. CCALF processing in 308, 309 is the same for both Chroma channels but it may be configured to work differently on each channel thanks to specific parameters provided in 305 and 306. For instance, each Chroma channel may be processed with specific filter coefficients.

In some variants, Chroma channel is subsampled compared to the Luma channel, for instance for videos using YUV 4:2:0 colour representation. On such variants, the CCALF filtering process 308, 309 is not applied on each Luma sample positions, but only on integer Luma sample position obtained when up-sampling the Chroma sample position. Thus on YUV 4:2:0 representation, the filtering is only applied to one fourth of the Luma sample positions ALF filtering processes 207, 208 and 209, and CCALF filtering processes 308 and 309 are independent, and thus, they can be performed in parallel. Compared to FIG. 2, there is a latency introduced in FIG. 3 by the addition operations performed in 311 and 312 to combine the results of the two Chroma filters for each channel. However, since CCALF and Chroma ALF are typically less complex than Luma ALF, in VTM-5.0, it should be feasible to achieve the overall processing of the 3 channels without additional latency—i.e. it is likely that the rate determining step is Luma ALF, and as such additional latency in the other two channels does not affect the latency of the overall process.

Input parameters information provided in 305 and 306 is transmitted in Adaptation Parameter Set (APS) and/or in slice header. 305, and 306 can also share some common information.

In one variant, 305 and 306 contains filter coefficients for a linear convolution filter (see FIG. 4 for instance). In one alternative 305 and 306 contains filter coefficients and clipping parameters for a non-linear filter, similar to the one used in VTM-5.0 for non-linear ALF filtering, for instance. Both linear and non-linear filters have been found to provide gains in coding performance, however linear filters are less complex and as such may be preferred in certain implementations.

In some variants, input parameters information provided in 305, and 306 may include IBDL and IBDC to deduce some left or right bitwise shift operations parameters (or multiplication/division operations parameters) to 'normalize' the data (e.g. sample values) between channels (i.e. to use comparable precision values).

It is understood that in some variants, CCALF can be applied even if no ALF filtering has been performed. It is also understood that Luma channel or other kind of channels could be used to correct other kind of channel than Chroma channel. For instance the Red channel could be used to correct the Green channel and/or the Blue channel in a video using an RGB colour representation.

It is also understood that in some variants more than one channel could be used to reduce the error of another channel. For instance the input image portions of both Chroma channels 202 and 203 could be both filtered with a CCALF filter and the result of the filtering of each image portion added to the output of ALF Luma filtering 207 in order to correct remaining errors in the Luma channel. Such variants may be particularly applicable when Chroma channel is subsampled compared to Luma channel. For example, in YUV 4:2:0 color representation, 4 different filters could be used on the Chroma samples, one filter for each one of the four Luma sample positions which are down-sampled/associated to one Chroma sample position. In other word for a 2×2 block of Luma samples a first filter is applied at the corresponding Chroma position to correct the Luma sample at position (0,0) in the 2×2 block, an a second, third and fourth filter are applied on the same Chroma sample position to respectively correct the Luma sample a position (0,1), (1,0) and (1,1). In a variant only one CCALF filter is used for the four Luma sample positions, but the filtered Chroma sample values are obtained by up-sampling the Chroma samples, to obtain Chroma samples aligned on the same grid as Luma samples.

FIG. 4A show an example of filter shape 401 that can be used when performing CCALF with a linear convolution filter. This filter shape is well suited for filtering Luma channel to correct error in Chroma channel of a video using YUV 4:2:0 colour representation, but it can also be used with other kinds of colour representations. Each box corresponds to samples positioned around a reference sample position (the box with grey dotted background). Each number in each box corresponds to the index of a filter coefficient to apply to the sample at the position of the box.

A Cb component Chroma sample at a position $(x_c, y_c)$ is filtered/corrected by adding to its value the amount:

$$O_{(x_c,y_c)}^{Cb} = f_0^{Cb} \cdot I_{(x,y-2)} + f_1^{Cb} \cdot I_{(x-1,y-1)} + \tag{1}$$

$$f_2^{Cb} \cdot I_{(x,y-1)} + f_3^{Cb} \cdot I_{(x+1,y-1)} + f_4^{Cb} \cdot I_{(x-2,y)} + f_5^{Cb} \cdot I_{(x-1,y)} +$$

$$f_6^{Cb} \cdot I_{(x,y)} + f_7^{Cb} \cdot I_{(x+1,y)} + f_4^{Cb} \cdot I_{(x+2,y)} + f_4^{Cb} \cdot I_{(x-2,y+1)} +$$

$$f_8^{Cb} \cdot I_{(x-1,y+1)} + f_9^{Cb} \cdot I_{(x,y+1)} + f_{10}^{Cb} \cdot I_{(x+1,y+1)} + f_4^{Cb} \cdot I_{(x+2,y+1)} +$$

$$f_{11}^{Cb} \cdot I_{(x-1,y+2)} + f_{12}^{Cb} \cdot I_{(x,y+2)} + f_{13}^{Cb} \cdot I_{(x+1,y+2)} + f_0^{Cb} \cdot I_{(x,y+3)}.$$

where $$f_i^{Cb}$$

are filter coefficients with index i of the filter for Cb Chroma component.

A similar filtering is applied for Cr component, but using $$f_i^{Cr}$$

filter coefficients.

The notation is simplified by using the following formula notation to obtain the same filtering:

$$O_{(x_c,y_c)}^{Cb} = \sum_i f_{(u_i,v_i)}^{Cb} \cdot I_{(x+u_i,y+v_i)}. \qquad (2)$$

where $$f_{(u_i,v_i)}^{Cb}$$

is the filter coefficient to apply with sample $I_{(x+u_i,y+v_i)}$ in the filter shape at offset $(u_i, v_i)$ of the reference sample (the box with grey dotted background in 401) which has a position (x,y).

The implementation of equation (2) is typically performed using integer operations for approximation of real number operation with fixed point computation. Equation (2) can then be rewritten as:

$$O_{(x_c,y_c)}^{Cb} = \left( \left( \sum_i f_{(u_i,v_i)}^{\prime Cb} \cdot I_{(x+u_i,y+v_i)} \right) + (1 \ll (B-1)) \right) \gg B. \qquad (3)$$

where $\ll$ is integer left bitwise shift operation, $\gg$ is integer right bitwise shift operation and B is decimal precision (typically 10 bits) of the fixed point representation of the filter coefficients $$f_{(u_i,v_i)}^{\prime Cb}$$

(see FIG. 4B); and $I_{(x+u_i,y+v_i)}$ is integer sample value with a integer precision equal to the IBD of the codec (typically 10 bits, see FIG. 4C).

In YUV 4:2:0 colour representation, Luma sample position (x, y) corresponds to the closest integer up-sampled Chroma position: $(x,y)=(2.x_c, 2.y_c)$.

In some variants, when IBDL is greater than IBDC, equation (3) can be rewritten as:

$$O_{(x_c,y_c)}^{Cb} = \qquad (4)$$
$$\left( \left( \sum_i f_{(u_i,v_i)}^{\prime Cb} \cdot \left( I_{(x+u_i,y+v_i)} \gg (IBDL - IBDC) \right) \right) + (1 \ll (B-1)) \right) \gg B,$$

or $$O_{(x_c,y_c)}^{Cb} = \qquad (5)$$
$$\left( \left( \sum_i \left( \left( f_{(u_i,v_i)}^{\prime Cb} \cdot I_{(x+u_i,y+v_i)} \right) \gg (IBDL - IBDC) \right) \right) + (1 \ll (B-1)) \right) \gg B,$$

or $$O_{(x_c,y_c)}^{Cb} = \qquad (6)$$
$$\left( \left( \left( \sum_i f_{(u_i,v_i)}^{\prime Cb} \cdot I_{(x+u_i,y+v_i)} \right) \gg (IBDL - IBDC) \right) + (1 \ll (B-1)) \right) \gg B,$$

and when IBDL is lower than IBDC, equation (3) can be rewritten as:

$$O_{(x_c,y_c)}^{Cb} = \left( \sum_i f_{(u_i,v_i)}^{\prime Cb} \cdot I_{(x+u_i,y+v_i)} \ll (IBDC - IBDL) + (1 \ll (B-1)) \right) \gg B, \qquad (7)$$

or, if B+IBDL is strictly higher than IBDC, equivalently:

$$O_{(x_c,y_c)}^{Cb} = \left( \sum_i f_{(u_i,v_i)}^{\prime Cb} \cdot I_{(x+u_i,y+v_i)} + (1 \ll B1 - 1) \right) \gg B1, \qquad (8)$$

with $B1 = B + IBDL - IBDC.$

The additional bitwise shift operation in equations (4), (5), (6) and (7) or the modified bitwise shift parameter in equation (8) allows to normalize the result of the filtering to keep same precision as Chroma sample values. To achieve this, in equation (4) Luma sample values are normalized; in equation (5) the result of the multiplication of Luma sample values by the coefficient values is normalized, or in equation (6), (7), and (8) the result of the sum of the multiplication outputs (i.e. the result of the filtering) is normalized.

Equation (6) can also be rewritten as in equation (8) with same results.

In equation (7), parenthesis are intentionally not put around bitwise shift, because, when IBDL is lower than IBDC, the computed result would be the same wherever the left shift is performed. This is then a matter of hardware or software design choice. Alternatively, the shifted value in equation (4) could also be rounded by adding 1<<(IBDC−IBDL−1) before applying the right shift by (IBDL−IBDC).

In terms of hardware/software design, when IBDL is greater than IBDC, an implementation following equation (8) formulation could be preferred because it requires fewer operations. In specific cases where IBDL will always be higher than IBDC, equation (4) could be preferred to limit the number of bits of the input of the multiplication: the number of bits that are gained in a system implementation using equation (4) will then depend on the maximum value that can take IBDC versus the maximum value that can take IBDL in that system (because it is the worst case that have to be handled). When IBDC is greater than IBDL, it may be preferable to use equation (8) to not increase input bit-depth of the multiplication especially when the maximum value that can take IBDC is always greater than the maximum value that can take IBDL. Equation (8) is the best compromise when the maximum value of IBDC is equal to the maximum value of IBDL.

For cases where B+IBDL is not strictly higher than IBDC, equation (8) can be rewritten in:

$$O_{(x_c,y_c)}^{Cb} = \left( \sum_i f_{(u_i,v_i)}^{\prime Cb} \cdot I_{(x+u_i,y+v_i)} \right) \ll B2, \qquad (9)$$

with $B2 = IBDC - IBDL - B.$

FIG. 4B shows a typical bitwise memory representation of CCALF filter coefficients in equation (3). The bitwise representation 402 of a CCALF filter coefficient typically uses a 16-bits signed integer representation (in a complement to tow representation) to store a fixed point value approximation of a real number. 10 bits precision is used for the decimal part the other bits are used to store the integer part and sign.

Figures 4D, 4E:
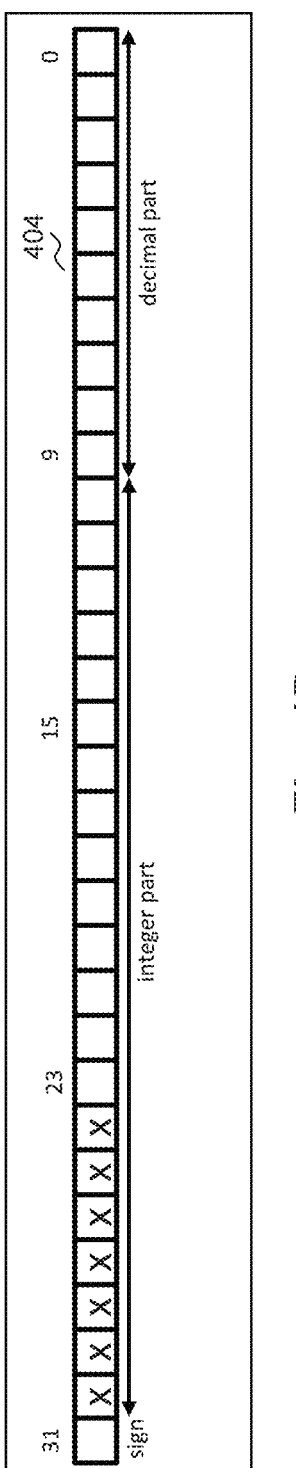
FIG. 4D shows a typical bitwise memory representation of the output of a multiplication of a CCALF filter coefficient with a sample value while performing CCALF filtering.
FIG. 4E shows a typical bitwise memory representation of the output of the addition operations performed for summing the results of the multiplications of CCALF filter coefficients with sample values while performing CCALF filtering.

FIG. 4C shows a typical bitwise memory representation of the sample values in equation (3) for a 10-bit internal bit-depth in VTM-5.0, when it is stored in a 16-bits integer memory space 403 (or register). The crossed boxes represent bits that are not used. FIG. 4D shows a typical bitwise memory representation of a 32-bits signed integer for storing the result of the multiplication of a 10-bit internal bit-depth sample value by a CCALF filter coefficient $$\left( f^{\prime Cb}_{(u_i, v_i)} \right).$$

$I_{(x+u_i, y+v_i)}$ for a given i for instance), when the CCALF filter coefficient representation corresponds to the one used in FIG. 4B. As can be seen, 24 bits precision is needed (the 10 bits precision of 403 plus the 14 bits precision of 402), plus one bit for the sign (i.e. 25-bits signed integer representation).

FIG. 4E shows a typical bitwise memory representation of a 32-bits signed integer for storing the intermediate results of the accumulation (sum) of the results of the multiplications of 10-bit internal bit-depth sample values by CCALF filter coefficients $$\left( \left( \sum_i f^{\prime Cb}_{(u_i, v_i)} \right).$$

$I_{(x+u_i, y+v_i)}$) for instance), when the CCALF filter coefficient representation corresponds to the one used in FIG. 4B, and when using the filter pattern in FIG. 4A. This corresponds to the bitwise memory required to store the sum of 18 25-bits signed integers, as in FIG. 4B. As can be seen, 29 bits precision is needed (the 10 bits precision of 403 plus the 14 bits precision of 402 plus 5 bits for the storing worst case result of the 18 additions), plus one bit for the sign (i.e. 30 bits signed integer representation).

According to embodiments of the invention the filtering operations in equation (3) for CCALF filtering are highly simplified compared to when using typical coefficient representation of FIG. 4B, especially for hardware dedicated design where the number of logical gates has a cost, and where the number of gates for performing a multiplications depends on the maximum number of bits of the inputs. It has been surprisingly found that significant simplification can be achieved with an impact on coding efficiency which is acceptable when accompanied with significant design simplifications. Generally, the simplifications disclosed below relate to using a reduced bitdepth representation (compared to an internal bitdepth) of either or both of the filter coefficients $$\left( f^{\prime Cb}_{(u_i, v_i)} \right)$$

or the cross-component input samples $(I_{(x+u_i, y+v_i)})$. The restricted bitdepth representation is restricted compared to an internal bitdepth of the first component samples, or restricted compared to a typical filter coefficient bitdepth (a common example of both being 10 bits).

It should be appreciated that certain combinations of reductions in bitdepth are particularly advantageous—for example when leading to a calculation that can be performed on 16-bit architecture. In any event, calculations using a restricted number of bits are faster, meaning that the additional cost (of either increased time or computation power) of CCALF (compared to simply ALF) is lower.

A first variant to reduce the number of bits of the multiplication inputs in equation (3) is to reduce the fixed-point decimal precision. This can be done by removing some of the lowest bits in FIG. 4B. Using 7 bits instead of 10, for instance, has been found to represent a good compromise (when 10 bits samples internal bit-depth is used for instance) so as to not reduce too much the coding gains of CCALF. In some variants, using 6 bits instead of 10, reduces a little bit much more the coding gains of CCALF, but it is still an interesting hardware design compromise.

Figure 5A:
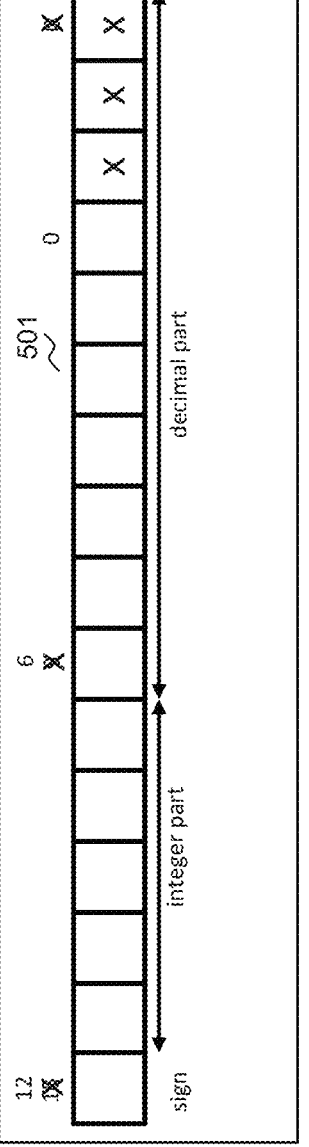
FIG. 5A shows a bitwise memory representation reducing the number of bits of a CCALF filter coefficient by reducing the precision of the coefficient values according to an example of a first variant of the invention.

FIG. 5A shows an example of bitwise memory representation of CCALF filter coefficients in equation (3), when limiting the fixed point decimal precision to 7 bits instead of 10 bits. The bitwise representation of 402 is then reduced to 13 bits (12 bits for the precision and one bit for the sign) in 501.

A second variant to reduce the number of bits of the multiplication inputs in equation (3) is to limit the range of the possible values of the filter coefficients. This can be achieved by removing some of the highest bits shown in FIG. 4B. It has surprisingly been found that CCALF can still work efficiently even when significantly limiting the range of the possible values of the coefficients. This is especially surprising as the effect is specific to CCALF, and this effect is not replicated with ALF, for instance-doing so introduces higher losses on coding gains. The surprisingly low impact on coding efficiency of such a simplification can be explained because the inventors have discovered that cross-component ALF is most useful where gradients of Luma samples are strong (e.g. near edges for instance) because Chroma errors on that location are generally stronger and are correlated with the Luma samples gradients. Moreover, the CCALF output in those areas is generally a small/limited value (while it is mostly zero elsewhere). So, the mathematically optimal filter coefficients (in Real domain) generally have a small amplitude, and can be well approximated by integer representations (of a fixed point decimal number) using a small number of bits. So the majority of the increase in coding performance can be achieved from a sub-set of the coefficients. Embodiments of the present invention exploit this property to simplify calculations without significantly affecting coding performance. This also explains why the third and fourth variants that will be presented below work: reducing the precision of the samples/coefficients generates a kind of 'rounding error noise' that does not significantly affect the estimation of the small value of the CCALF output.

In summary, it has been found that:
i. Limiting coefficients to the range between −0.03125 and 0.03125 (e.g. not using any bit higher than the 6th bit of decimal point precision) has an acceptable coding impact
ii. Limiting coefficients to the range between −0.0625 and 0.0625 (e.g. not using any bit higher than the 5th bit of decimal point precision) has no significant coding impact
iii. Limiting coefficients to the range between −0.125 and 0.125 (e.g. not using any bit higher than the 4th bit of decimal point precision) has nearly no coding impact
iv. Limiting coefficients to the range between −0.25 and 0.25 (e.g. not using any bit higher than the 3th bit of decimal point precision) has negligible coding impact
v. Limiting coefficients to the range between −0.015625 and 0.015625 (e.g. not using any bit higher than the 7th bit of decimal point precision) has coding impact that may be tolerated in certain implementations.

The limit values of the range may be included or not in the usable coefficient values. Examples using these three ranges are detailed below, but alternative ranges could also be used.

In the following description, results are provided. These results were obtained using "JVET common test conditions and software reference configurations for SDR video" defined in JVET-N01010 document; but restricting the test conditions to be applied to the 17 first frames of the video sequences. Thus, the invention variants have been implemented on top of VTM-5.0 software (or a later intermediate development version, during the development process for providing VTM-6.0 software) which one has been used as reference. The average BD-rate coding gains results of "all intra" (AI), "random access" (RA), "low-delay B" (LB) and "low-delay P" (LP) configurations are obtained for Luma channel and both Chroma channels in comparison to the reference (e.g. VTM-5.0). These average channel coding gains are combined by summing 14 times Luma coding gains to the coding gains of each Chroma channel, and by diving the sum by 16 to obtain an average YUV coding gain. This is a conventional way of combining Luma and Chroma channel results, as Chroma channels are easier to encode than Luma channel. The average YUV coding gain obtained on AI, RA LB and LP configurations are averaged together, and these final average coding gains values are compared together to provide coding gains comparisons. The coding gains comparisons are expressed as percentages of a reference which is (when not explicitly specified to be different) the reference software (i.e. VTM-5.0 or later intermediate development version) with CCALF implemented on top of it, as specified in JVET-O0636 contribution, but not including the invention for simplifying it. The compared variant is implemented by simplifying that reference (i.e. using the same VTM-5.0 or later intermediate development version, and CCALF implemented on top of it but simplified with the invention). The percentages are obtained by computing the ratio between the coding gains of the variant (which is an average BD-rate gain expressed in percentage of rate reduction for a same quality) and the coding gains of the reference (also an average BD-rate gain). For information, using the reference CCALF on top of VTM-5.0 provides an average YUV coding gain of around-1.2% compared to VTM-5.0.

The coding gain comparison results provided below are informative and, the percentage of coding gains reported could be different when implementing the invention on top of another encoder implementation, or on top of another codec specification.

In the following description, range notations will be used with the following meaning:

]x,y[, means a range of values between x and y, but not including x nor y,

[x,y[, means a range of value between x and y, including x but not y

]x,y], means a range of values between x and y, including y but not x

[x,y], means a range of values between x and y, including x and y

Using coefficient in the range [−0.03125;0.03125[ (i.e. not using any bit higher than the $6^{th}$ bit of fixed point decimal precision) retains the vast majority coding gains of CCALF, while significantly reducing the number bits to use for the multiplication. An example of this variant is illustrated by FIG. 5B.

Figure 5B:
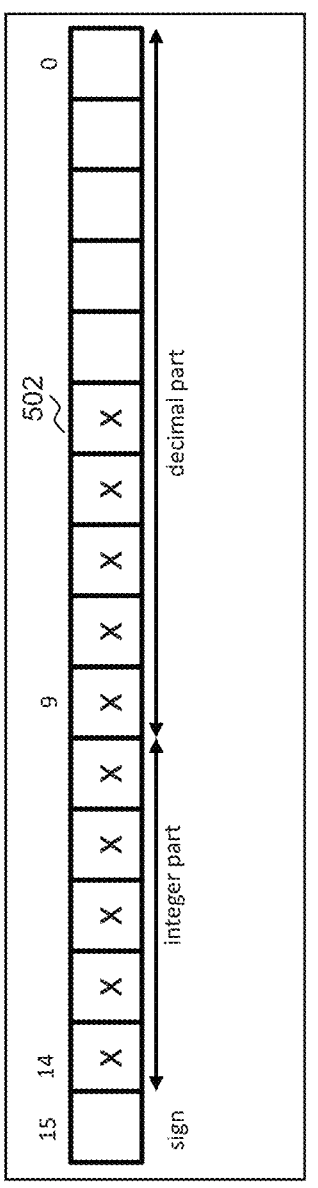
FIG. 5B shows a bitwise memory representation reducing the number of bits of a CCALF filter coefficient by limiting the range of the possible coefficient values according to an example of a second variant of the invention.

FIG. 5B shows an example of bitwise memory representation of CCALF filter coefficients in equation (3), when using a fixed-point decimal precision of 10 bits and limiting the range of the possible values of the coefficients to the range [−0.03125;0.03125[. The bitwise representation of 402 is then reduced to 6 bits (5 bits for the precision and one bit for the sign) in 502.

Figure 5C:
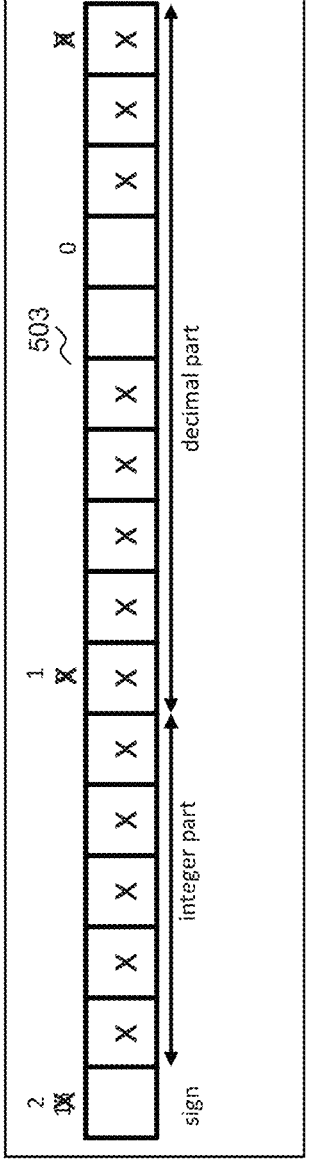
FIG. 5C shows a bitwise memory representation reducing the number of bits of a CCALF filter coefficient by reducing the precision of the coefficient values and by limiting the range of the possible coefficient values according to an example combining first and second variants of the invention.

The second variant (FIG. 5B) can be combined with the first variant (FIG. 5A) as illustrated in FIG. 5C.

FIG. 5C shows an example of bitwise memory representation of CCALF filter coefficients in equation (3), when limiting the fixed point decimal precision to 7 bits instead of 10 bits and limiting the range of the possible values of the coefficients to the range [−0.03125;0.03125[. The bitwise representation of 402 is then reduced to 3 bits (2 bits for the precision and one bit for the sign) in 503.

It is possible to go a little further in the simplification, by limiting the coefficients in the range ]−0.03125;0.03125[ (i.e. filter coefficient can only take values in {−0.0234375, −0.015625, −0.0078125, 0, 0.0078125, 0.015625, 0.0234375} set of values) such that it is possible to replace each multiplication by two additions/subtractions (depending on sign handling) and bitwise shifts (in the case illustrated by FIG. 5C). For instance multiplications in equation (3) could be replaced by, for example:

$$
O^{Cb}_{(x_c,y_c)} = \tag{10}
$$

$$
\left( \left( \sum_i \left( \begin{cases} \begin{cases} I_{(x+u_i,y+v_i)} & \text{if } f'^{Cb}_{(u_i,v_i),Cb} \in \{0.015625, 0.0234375\}, \\ -I_{(x+u_i,y+v_i)} & \text{if } f'^{Cb}_{(u_i,v_i)} \in \{-0.015625, -0.0234375\}, \\ 0 & \text{else.} \end{cases} \\ \begin{cases} I_{(x+u_i,y+v_i)} \ll 1 & \text{if } f'^{Cb}_{(u_i,v_i)} \in \{0.0078125, 0.0234375\}, \\ -I_{(x+u_i,y+v_i)} \ll 1 & \text{if } f'^{Cb}_{(u_i,v_i)} \in \{-0.0078125, -0.0234375\}, \\ 0 & \text{else.} \end{cases} \end{cases} + \right) + (1 \ll (B-1)) \right) \right) \gg
$$

B.

where << is integer left bitwise shift operation, >> is integer right bitwise shift operation and B is decimal precision (7 bits) of the fixed point representation of the filter coefficients $$
f'^{Cb}_{(u_i,v_i)}
$$

(see FIG. 5C); and $I_{(x+u_i,y+v_i)}$ is integer sample value with a integer precision equal to the internal bit-depth of the codec (typically 10 bits, see FIG. 4C).

The multiplication can even be replaced by only one addition/subtraction (depending on sign handling) and bitwise shift. However, this introduces more losses in the coding gains of CCALF. It can be done, for instance, when limiting the precision of the fixed point decimal precision to 6 bits, and limiting the coefficient in the range ]−0.03125; 0.03125[ (i.e. filter coefficient can only take values in {−0.015625, 0, 0.015625} set of values). It can also be done, for instance, when limiting the precision of the fixed point decimal precision to 7 bits and limiting the coefficient in the range]−0.015625; 0.015625[ (i.e. filter coefficient can only take values in {−0.0078125, 0, 0.078125} set of values). Using the first alternative allows to keep around 78% of the CCALF gains compared to using 10 bits decimal precision and using filter coefficients in the range ]−1;1[. Using second alternative allows to keep around 76% of the CCALF gains.

In some other alternatives the range of the values for the coefficients is [−0.0625;0.0625[, ]−0.0625;0.0625[, [−0.125; 0.125[, ]−0.125;0.125[, [−0.25;0.25] or ]−0.25;0.25]. i.e. one, two, or three additional highest bits are kept for the (decimal part) precision of the coefficients. For instance, alternatively to FIG. 5C, 3 or 4 bits are kept for the filter coefficients instead of 2. In such alternatives the additional bit are the 1 or 2 higher bits to the one kept in FIG. 5C. The second and fourth of this four alternatives allow to replace the multiplication by respectively three and four additions/subtractions (depending on sign handling) and bitwise shifts.

A third variant to reduce the number of bits of the multiplication inputs in equation (3) is to reduce the precision of the sample values. This can be done by not considering the lowest bits of the sample values (which would be equivalent to using a bitwise shift to the right using a CPU implementation). For instance, equation (3) could be rewritten as:

$$O_{(x_c,y_c)}^{Cb} = \tag{11}$$
$$\left(\left(\sum_i f_{(u_i,v_i)}'^{Cb} \cdot \left(I_{(x+u_i,y+v_i)} \gg DB\right)\right) + (1 \ll (B-DB-1))\right) \gg B-DB.$$

where DB corresponds to the number of dead bits (i.e. bits ignored/not considered). An example of bitwise representation of the sample values $(I_{(x+u_i,y+v_i)} \gg DB)$ used in the multiplication for this variant is illustrated in FIG. 5D.

Figure 5D:
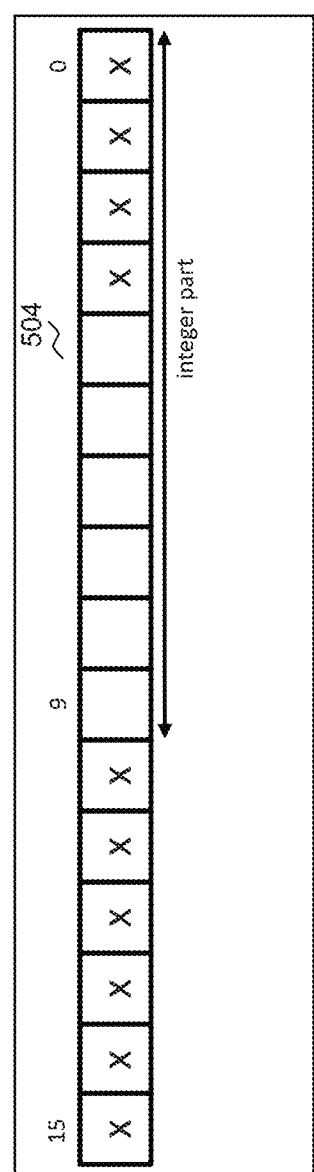
FIG. 5D shows a bitwise memory representation reducing the number of bits of a sample value used inside of the filtering process by ignoring lowest bits according to an example of a third variant of the invention.

FIG. 5D shows an example of bitwise memory representation of the sample values used in equation (3) for a 10-bit internal bit-depth in VTM-5.0, when limiting the precision of the sample values to 6 bits instead of 10 bits for simplifying hardware implementation of the multiplication operations in equation (3). The crossed boxes represent bits that are not used. The bitwise representation of 403 is reduced to 6 bits in 504.

An alternative is to "round" the sample value using the highest removed bit value, for instance (e.g. by adding 1 to the representation with reduced number of bits if the highest removed bit was one, or equivalently adding the value corresponding to the one of the highest removed bit before removing/not considering the not wanted bits). Such alternative is interesting when reducing the sample precision impacts the coding efficiency of CCALF to a greater degree, but it also implies using additional operations and/or memory compared to only ignoring the lowest bits.

It has been found that in the context of a VTM-5.0 improved by using CCALF keeping only the 6 highest bits of the sample values when performing the filtering operations does not significantly impact the coding efficiency. For instance, with an internal bit-depth of 10 bits, the 4 lowest bits of the sample values can be ignored with low impact on CCALF efficiency. Keeping fewer than the 6 highest bits of the sample values is possible, but decreases the coding efficiency of CCALF. For instance keeping the 4 highest bits of the sample values (i.e. removing the 6 lowest bits on 10 bits samples) when performing the filtering operations still provides surprisingly interesting gains (on average, around 88% of the CCALF gains are kept compared to using the full sample precision on 10 bits samples). While keeping 5 highest bits allows to keep around 95% of the CCALF gains compared to using the full sample precision. With 6 highest bits results are around 98% of the gains are retained. Keeping more than the 6 highest bits only slightly increase the results. For instance keeping 7 or 8 highest bits (i.e. removing the lowest 3 or 2 bits of a 10 bits internal bitdepth) provides results around 99% of the CCALF gains with full sample precision.

In a fourth variant, the CCALF filtering as expressed in equation (2) is modified to be closer to the filtering formulation of the non-linear ALF (NLALF) in VTM-5.0:

$$O_{(x_c,y_c)}^{Cb} = f_{(0,0)}^{Cb} \cdot I_{(x,y)} + \sum_{i>0} f_{(u_i,v_i)}^{Cb} \cdot \left(I_{(x+u_i,y+v_i)} - I_{(x,y)}\right), \tag{12}$$

where $$f_{(u_i,v_i)}^{Cb}$$

is still a filter coefficient, but is multiplied with a figure representing of the difference value between the sample $I_{(x+u_i,y+v_i)}$ in the filter shape at offset $(u_i,v_i)$ of the reference sample, and the value of reference sample $I_{(x,y)}$ (the box with grey dotted background in 401) which has a position (x,y). The figure representing the difference value may be a gradient, which is equivalent to a difference for samples adjacent to the reference sample. Using a gradient would represent a normalisation of the difference for samples which are both adjacent and non-adjacent to the reference sample.

Equation (12) can be implemented with integer operations in a same way as equation (2) was implemented with integer operations in equation (3):

$$O_{(x_c,y_c)}^{Cb} = \tag{13}$$
$$\left(f_{(0,0)}'^{Cb} \cdot I_{(x,y)} + \left(\sum_{i>0} f_{(u_i,v_i)}'^{Cb} \cdot \left(I_{(x+u_i,y+v_i)} - I_{(x,y)}\right)\right) + (1 \ll (B-1))\right) \gg B$$

where $\ll$ is integer left bitwise shift operation, $\gg$ is integer right bitwise shift operation and B is decimal precision (typically 10 bits) of the fixed point representation of the filter coefficients $$f_{(u_i,v_i)}'^{Cb}$$

Figures 6A, 6B, 6C:
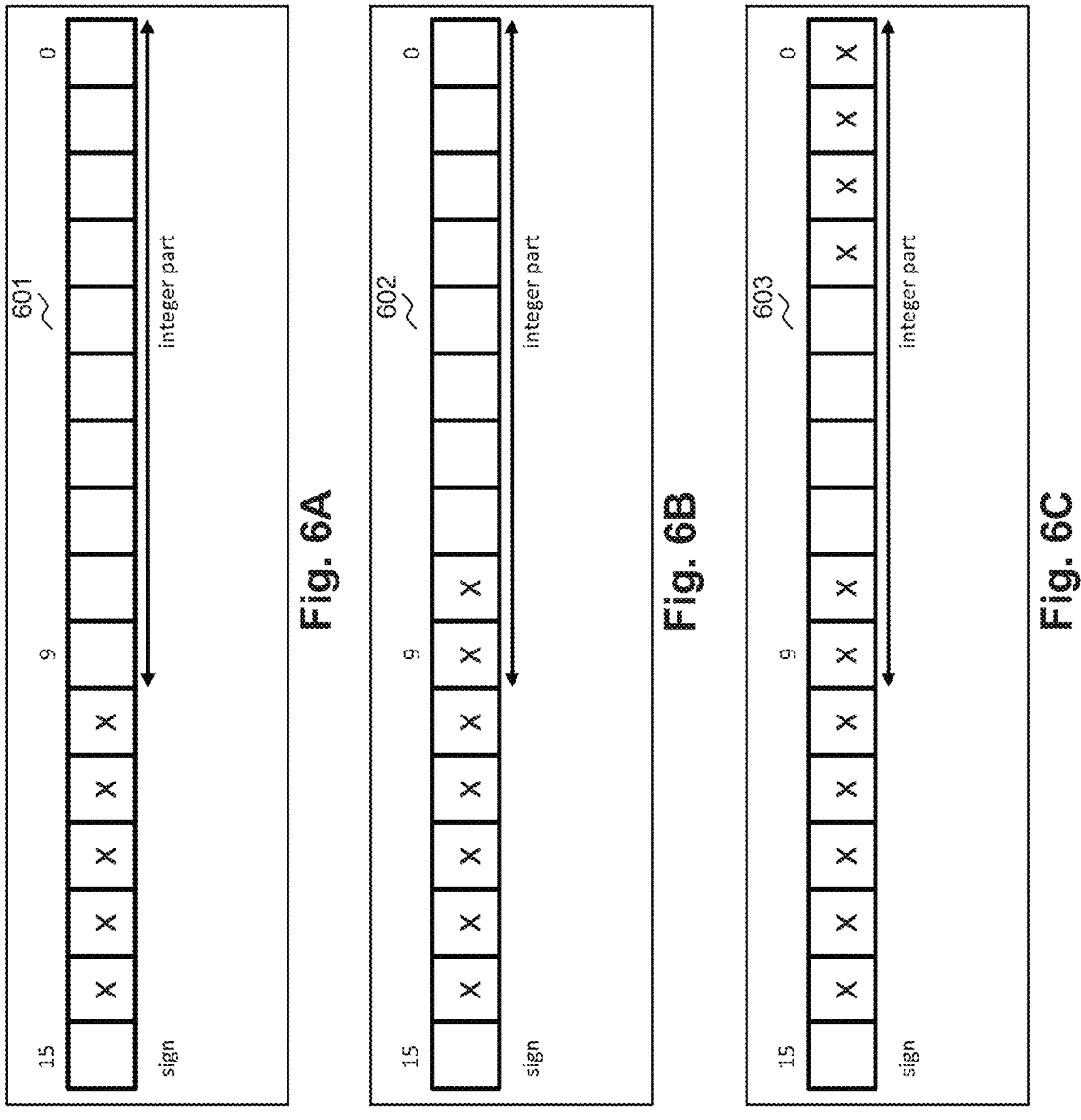
FIG. 6A shows a bitwise memory representation of a sample values' difference used inside of the filtering process according to an example of a fourth variant of the invention.
FIG. 6B shows a bitwise memory representation of a sample values' difference when using clipping operation to reduce the number of bits inside of the filtering process according to an example of a fourth variant of the invention.
FIG. 6C shows a bitwise memory representation of a sample values' difference when using clipping operation and ignoring lowest bits to reduce the number of bits inside of the filtering process according to an example combining the third and the fourth variants of the invention.

(see FIG. 4B); and $I_{(x+u_i,y+v_i)}$ and $I_{(x,y)}$ are integer sample value with a integer precision equal to the internal bit-depth of the codec (typically 10 bits, see FIG. 4C). When using this formulation, one bit indicating the sign is added to the bitwise representation of $(I_{(x+u_i,y+v_i)} - I_{(x,y)})$ compared to the bitwise representation of $I_{(x+u_i,y+v_i)}$. This is illustrated in FIG. 6A. In some alternatives $$f_{(0,0)}'^{Cb}$$

is always equal to zero and is not coded in the bitstream. In other alternatives, $$f_{(0,0)}'^{Cb}$$

is not necessarily equal to zero and the multiplication $$f_{(0,0)}'^{Cb}.$$

$I_{(x,y)}$ is handled as the multiplications in the other variants not using difference to reference sample.

FIG. 6A shows a bitwise memory representation of the sample values' difference $(I_{(x+u_i,y+v_i)} - I_{(x,y)})$ in equation (13) for a 10-bit internal bit-depth in VTM-5.0, when it is stored in a 16-bits integer memory space 601 (or register). The crossed boxes represent bits that are not used.

In a hardware design point of view, the difference with reference sample as no cost, because it is already present/computed for NLALF filtering of Luma samples (the filter shape of the CCALF filter is included in the shape of the filter for Luma in NLALF).

The coding gains of CCALF when using the filtering of equation (3) is comparable to when using the filtering of equation (13).

One advantage of using this representation is that for reducing the number of bits of the inputs of the $$f_{(u_i,v_i)}^{'Cb}.$$

$(I_{(x+u_i,y+v_i)}-I_{(x,y)})$ multiplication, the difference values can be clipped in order to stay in a range that requires fewer bits to be represented:

$$O_{(x_c,y_c)}^{Cb} = \qquad (14)$$
$$\left(f_{(0,0)}^{'Cb} \cdot I_{(x,y)} + \left(\sum_{i>0} f_{(u_i,v_i)}^{'Cb} \cdot K\left(I_{(x+u_i,y+v_i)} - I_{(x,y)}, C\right)\right) + (1 \ll (B-1))\right) \gg B$$

where K is a clipping function, for instance:

$$K(d, C) = \max(-C, \min(C, d)) \qquad (15)$$

or equivalently:

$K(d,C)=\min(C,\max(-C,d))$; and where C is a clipping parameter and d is the figure representing the difference. It should be noted that a particular difference between this expression and non-linear ALF in VTM-5.0 is that the clipping parameter C is the same for every sample position and its value is fixed and is chosen for restricting the number of bits for storing $K(I_{(x+u_i,y+v_i)}-I_{(x,y)},C)$ that is an input of the multiplication, while in non-linear ALF, the clipping parameter C varies for each sample position and its value is transmitted together with the filter coefficients (in an APS).

Particularly advantageous fixed values of C have been found to be $2^{IBitDepth-2}-1$ or $2^{IBitDepth-3}-1$, where IBitDepth is the internal bit-depth of the codec (i.e. the number of bits for representing the sample values). For instance, with 10 bits internal bit depth, good values of C are 255 or 127. This example clipping operation then allows to save two or three bits in the input of the multiplication.

Using smaller values of C would be possible, but would tend to reduce the coding efficiency of CCALF whereas higher values reduces the simplification efficacy provided by the clipping process. As such, a generalisation of the clipping parameter C is $2^{IBitDepth-n}-1$, where n is an integer less than IbitDepth. For low values of n, the reduction in coding efficiency is lower but the advantages associated with simplification are also lower; the reverse is true for high values of n.

FIG. 6B gives an example of bitwise memory representation for storing clipped difference $K(I_{(x+u_i,y+v_i)}-I_{(x,y)},C)$ in equation (14) for a 10-bit internal bit-depth and C=255, when it is stored in a 16-bits integer memory space 602 (or register).

The fourth variant can be combined with third variant, to ignore lower precision bits of the clipped difference value $K(I_{(x+u_i,y+v_i)}-I_{(x,y)},C)$. A particularly advantageous combination is to keep the same number of lower bits removal as in second variant, so that CCALF coding gains are not significantly affected. This example is illustrated by FIG. 6C.

FIG. 6C provides an example of bitwise memory representation for storing $K(I_{(x+u_i,y+v_i)}-I_{(x,y)},C)$ with an internal bit-depth of 10 bits, C=255 and the four lowest bits ignored. Then at the input of the multiplication, only the four remaining precision bits plus one bit for sign of 603 are needed to represent $K(I_{(x+u_i,y+v_i)}-I_{(x,y)},C)$, instead of 10. This represents a significant saving in the number of bits being calculated, and results in a simpler implementation.

In some embodiments, combinations of the four variants are performed. For instance variants one, two, three and optionally four are combined so that the output result of the multiplication operation can be represented on 10 precision bits plus one sign bit, so that the sum of the results of the multiplications can be represented on maximum 15 bits plus one sign bit (thus being representable/storable in a 16-bits register or memory space). Such an embodiment is particularly well-suited for hardware implementation. FIG. 7A, and FIG. 7B illustrates an example of the intermediate representation (multiplication output) and of the final representation (sum results) of the filtering operations, before the final rounding and bit-shift to add the results to the Chroma sample value.

FIG. 7A provides an example of bitwise memory representation for storing $$f_{(u_i,v_i)}^{'Cb}.$$

$I_{(x+u_i,y+v_i)}$, when keeping only the 8 highest bits of the sample value (as in FIG. 5D for instance), keeping 7 bits precision for the decimal part of the coefficient, and a [−0.03125; 0.03125[ or ]−0.03125;0.03125[ range for the coefficients (i.e. 2 bits plus a sign bit to store them as in FIG. 5C for instance) The multiplication results can then be stored on 10 bits plus one sign bit.

Using equation (4) for handling different Luma bitdepth IBDL and Chroma bitdepth IBDC, and equation (11) with DB=IBDL−KB, with KB equal to the number of highest precision bits kept for the Luma sample values (e.g. KB=8 in this example), equation (3) can rewritten as:

$$O_{(x_c,y_c)}^{Cb} = \left(\left(\sum_i f_{(u_i,v_i)}^{''Cb} \cdot \left(I_{(x+u_i,y+v_i)} \gg B3\right)\right) + (1 \ll (B4-1))\right) \gg B4. \qquad (16)$$

with B3=DB+(IBDL−IBDC)=2.IBDL−IBDC−KB, and B4=BDPC−B3, with BDPC the number of bits for decimal part of the coefficient (e.g. BDPC=7 for the 7 bits precision of the decimal part of the coefficients in this example), and $$f_{(u_i,v_i)}^{'Cb}$$

integer representation of the coefficients (i.e. integer values representing fixed point values in the range [−0.03125; 0.03125[ or ]−0.03125;0.03125[, in this example, the integer values taking values in the integer range [−4;3] or [−3;3], in this example). This equation is valid for KB≤2.IBDL−IBDC≤BDPC+KB−1. When KB≤2.IBDL−IBDC and 2.IBDL−IBDC=BDPC+KB (i.e. B4=0), equation (16) can be replaced by:

$$O^{Cb}_{(x_c,y_c)} = \sum_i f''^{Cb}_{(u_i,v_i)} \cdot (I_{(x+u_i,y+v_i)} \gg B3), \qquad (17)$$

when KB≤2.IBDL−IBDC and 2.IBDL−IBDC>BDPC+KB, equation (16) can be replaced by:

$$O^{Cb}_{(x_c,y_c)} = \left( \left( \sum_i f''^{Cb}_{(u_i,v_i)} \cdot (I_{(x+u_i,y+v_i)} \gg B3) \right) \right) \ll (-B4), \qquad (18)$$

and when 2.IBDL−IBDC<KB, equation (16) can be replaced by:

$$O^{Cb}_{(x_c,y_c)} = \left( \left( \sum_i f''^{Cb}_{(u_i,v_i)} \cdot (I_{(x+u_i,y+v_i)} \ll (-B3)) \right) + (1 \ll (B4-1)) \right) \gg B4. \qquad (19)$$

In the given example, where KB=8, for 10-bits Luma and Chroma bitdepth (i.e. IBDL=IBDC=10), equation (16) can be written as:

$$O^{Cb}_{(x_c,y_c)} = \left( \left( \sum_i f''^{Cb}_{(u_i,v_i)} \cdot (I_{(x+u_i,y+v_i)} \gg 2) \right) + 16 \right) \gg 5. \qquad (20)$$

This results in each coefficient being represented by 2 bits and a sign bit, and each sample being represented by a reduced number of 8 bits, and optionally (depending on implementation/design choice) a sign bit (equal to zero)-and as such the multiplication result can be represented by 8 bits and a sign.

FIG. 7A is also valid for providing an example of bitwise memory representation for storing $$f'^{Cb}_{(u_i,v_i)}.$$

$I_{(x+u_i,y+v_i)}$, when keeping only the 6 highest bits of the sample value (with two more higher bits than in FIG. 5D for instance), keeping 7 bits precision for the decimal part of the coefficient, and a [−0.125;0.125[ or ]−0.125;0.125[ range for the coefficients (i.e. 4 bits plus a sign bit to store them as with two more higher bits than in FIG. 5C for instance) The multiplication results can then be stored on 10 bits plus one sign bit.

In that given example, KB=6. For 10-bits Luma and Chroma bitdepth (i.e. IBDL=IBDC=10), equation (16) can be written as:

$$O^{Cb}_{(x_c,y_c)} = \left( \left( \sum_i f''^{Cb}_{(u_i,v_i)} \cdot (I_{(x+u_i,y+v_i)} \gg 4) \right) + 4 \right) \gg 3. \qquad (21)$$

FIG. 7B provides an example of bitwise memory representation for computing and storing the sum operations $$\sum_i f'^{Cb}_{(u_i,v_i)}.$$

$I_{(x+u_i,y+v_i)}$, when $$f'^{Cb}_{(u_i,v_i)}.$$

$I_{(x+u_i,y+v_i)}$ is represented and computed as explained with FIG. 7A. It should be appreciated that this is for the case where the filter is as per FIG. 4A with 17 distinct additions of 18 multiplication results. The worst case of the 17 additions (when considering the 10 bits integer values storing a fixed point value) is 18 times the integer values $-2^{10=-1024}$, i.e. −18432 which can be stored on 15 bits and a sign bit-meaning that the addition result can be represented using 15 bits and a sign bit.

In a further (fifth) variant, the filter pattern of FIG. 4A is modified, so that instead of 18 samples, 16 samples or less are used in the filtering process. Thus in the summing operations one bit can be saved. Moreover, it has the advantage of simplifying the filtering computation since some multiplication operations are removed. For instance in FIG. 4B, instead of using 29 precision bit and one sign bit, only 28 precision bit and one sign bit would be used, and in FIG. 7B, instead of using 15 precision bits, only 14 precision bits would be used. In some alternatives using that fifth variant, the bit saved in the addition operations is spent for increasing the precision of the multiplication results. For instance in FIG. 7A 11 precision bits would be used instead of 10. In one alternative, the decimal part of the 10 precision bits is increased by one bit (from 7 bits to 8 bits). This can be achieved by adding one lower precision bit in the decimal part of the coefficient values. For instance in FIG. 5C, the bit on the right of the rightmost used one would be used again. Alternatively, this can be achieved by using one more precision bit to the sample value, if third variant is used. For instance in FIG. 5D, the bit on the right of the rightmost used one would be used again. In a second alternative, the integer part of the 10 precision bits is increased by one bit (from 3 bits to 4 bits). This is achieved by adding one higher precision bit to the coefficient values (i.e. increasing the range of possible coefficient values). For instance in FIG. 5C, the bit on the left of the leftmost used one would be used again.

These fifth variant alternatives are of particular interest when using existing hardware with registers having a fixed size, and where the cost of the multiplication is the same whenever the result fits into the registers (for instance for software implementation running as instructions for a CPU to process operation implying registers or memory locations of predefined sizes). It is also of interest when hardware design uses existing predefined circuits templates for implementing fixed size operations (for a matter of development speed/cost for instance), with no matter if some of the bits are not used. Then, in both cases, the cost (in terms of execution latency and/or in terms of number of logical gates used for the implementation) of a multiplication on, for instance, 10 bits or 11 bits does not change if they are both implemented for instance with 16 bits inputs and 32 bits output, but the coding gain of CCALF is slightly better with the second version, because it uses one more precision bit.

Figure 7G:
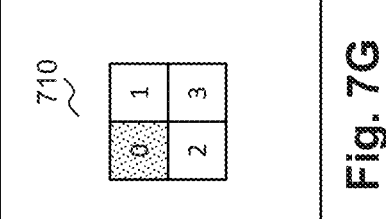
FIG. 7G provides a filter shape and coefficient arrangement for an example of CCALF filter using 4 samples to reduce the number of bits and operations used in CCALF filtering process according to a fifth variant of the invention.
Figure 7F:
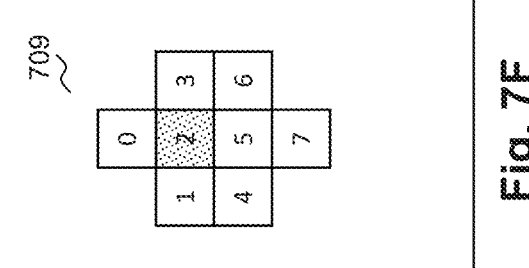
FIG. 7F provides a filter shape and coefficient arrangement for an example of CCALF filter using 8 samples to reduce the number of bits and operations used in CCALF filtering process according to a fifth variant of the invention.

In an alternative, 8 samples (or fewer) are used in the filtering so that 2 bits (or more) can be saved in the summing operations, see for instance FIG. 7F where 8 samples are used (2 bits saved), or FIG. 7G where only 4 samples are used (3 bits saved). In variants of that alternative, the 2 bits saved (or more) in the sum are redistributed between the inputs of the multiplication to have more precision and fully use the precision of 16 bits registers, for instance, during the filtering process.

FIG. 7C provides one example of filter pattern 706 using only 16 samples for the filtering. With that filter pattern, the filtering operations become:

$$O_{(x_c,y_c)}^{Cb} = f_0^{Cb} \cdot I_{(x-1,y-1)} + f_1^{Cb} \cdot I_{(x,y-1)} + f_2^{Cb} \cdot I_{(x+1,y-1)} +$$

$$f_3^{Cb} \cdot I_{(x-2,y)} + f_4^{Cb} \cdot I_{(x-1,y)} + f_5^{Cb} \cdot I_{(x,y)} + f_6^{Cb} \cdot I_{(x+1,y)} + f_3^{Cb} \cdot I_{(x+2,y)} +$$

$$f_7^{Cb} \cdot I_{(x-2,y+1)} + f_8^{Cb} \cdot I_{(x-1,y+1)} + f_9^{Cb} \cdot I_{(x,y+1)} + f_{10}^{Cb} \cdot I_{(x+1,y+1)} +$$

$$f_7^{Cb} \cdot I_{(x+2,y+1)} + f_{11}^{Cb} \cdot I_{(x-1,y+2)} + f_{12}^{Cb} \cdot I_{(x,y+2)} + f_{13}^{Cb} \cdot I_{(x+1,y+2)}$$

This selection of samples can be described as a 'diamond' shape, where each sample has a position (x+u, y+v) relative to the reference sample where u ∈ [−2,2] and v ∈ [−1,2], and v ∈ [0,1] when |u|=2.

FIG. 7D provides another example of filter pattern 707 using 16 samples for the filtering. This pattern is more suited than the one in FIG. 7C when using a YUV 4:2:0 video representation, with a Chroma sample subsampled position that is located in the middle of the position of sample 5, sample 6, sample 9 and sample 10 in 707. According to one variant, two or more filter patterns are available, and one filter pattern is chosen according to Chroma subsampling in YUV 4:2:0. In one alternative, the filter pattern index is provided/signalled in the bitstream, in a parameter set for instance (e.g. SPS or PPS). With that filter pattern, the filtering operations become:

$$O_{(x_c,y_c)}^{Cb} = f_0^{Cb} \cdot I_{(x-1,y-1)} + f_1^{Cb} \cdot I_{(x,y-1)} + f_2^{Cb} \cdot I_{(x+1,y-1)} +$$

$$f_3^{Cb} \cdot I_{(x-2,y)} + f_4^{Cb} \cdot I_{(x-1,y)} + f_5^{Cb} \cdot I_{(x,y)} + f_6^{Cb} \cdot I_{(x+1,y)} + f_7^{Cb} \cdot I_{(x+2y)} +$$

$$f_8^{Cb} \cdot I_{(x-1,y+1)} + f_9^{Cb} \cdot I_{(x,y+1)} + f_{10}^{Cb} \cdot I_{(x+1,y+1)} + f_{11}^{Cb} \cdot I_{(x+2,y+1)} +$$

$$f_{12}^{Cb} \cdot I_{(x-1,y+2)} + f_{13}^{Cb} \cdot I_{(x,y+2)} + f_{14}^{Cb} \cdot I_{(x+1,y+2)} + f_{14}^{Cb} \cdot I_{(x+2,y+2)}$$

Figure 7E:
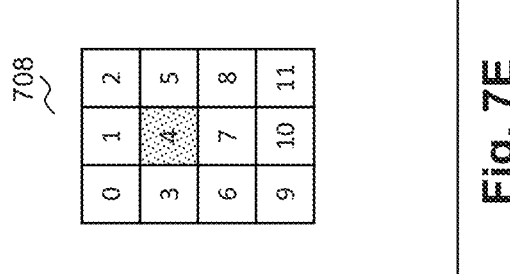
FIG. 7E provides a filter shape and coefficient arrangement for an example of CCALF filter using 12 samples to reduce the number of bits and operations used in CCALF filtering process according to a fifth variant of the invention.

This selection of samples can be described as each sample having a position (x+u, y+v) relative to the reference sample where u ∈ [−1,2] and v ∈ [−1,2], FIG. 7E provides an example of filter pattern 708 using 12 samples for the filtering. This pattern allow accessing fewer samples than the pattern in FIG. 7C, and to code less coefficients in the bitstream, but it does not allow to further reduce the number of bits used in the summing operations. With that filter pattern, the filtering operations become:

$$O_{(x_c,y_c)}^{Cb} = f_0^{Cb} \cdot I_{(x-1,y-1)} + f_1^{Cb} \cdot I_{(x,y-1)} + f_2^{Cb} \cdot I_{(x+1,y-1)} +$$

$$f_3^{Cb} \cdot I_{(x-1y)} + f_4^{Cb} \cdot I_{(x,y)} + f_5^{Cb} \cdot I_{(x+1,y)} + f_6^{Cb} \cdot I_{(x-1,y+1)} + f_7^{Cb} \cdot I_{(x,y+1)} +$$

$$f_8^{Cb} \cdot I_{(x+1,y+1)} + f_9^{Cb} \cdot I_{(x-1,y+2)} + f_{10}^{Cb} \cdot I_{(x,y+2)} + f_{11}^{Cb} \cdot I_{(x+1,y+2)}$$

This selection of samples can be described as each sample having a position (x+u, y+v) relative to the reference sample where u ∈ [−1,1] and v ∈ [−1,2].

FIG. 7F provides an example of filter pattern 709 using only 8 samples for the filtering. This pattern enables a further reduction of the number of bits used in the summing operations by one, compared to pattern in FIG. 7C. It then allows to reduce by two bits compared to pattern in FIG. 4A. With that filter pattern, the filtering operations become:

$$O_{(x_c,y_c)}^{Cb} = f_0^{Cb} \cdot I_{(x,y-1)} + f_1^{Cb} \cdot I_{(x-1,y)} + f_2^{Cb} \cdot I_{(x,y)} + f_3^{Cb} \cdot I_{(x+1,y)} +$$

$$f_4^{Cb} \cdot I_{(x-1,y+1)} + f_5^{Cb} \cdot I_{(x,y+1)} + f_6^{Cb} \cdot I_{(x+1,y+1)} + f_7^{Cb} \cdot I_{(x,y+2)}$$

This selection of samples can be described as a 'diamond shape', where each sample has a position (x+u, y+v) relative to the reference sample where u ∈ [−1,1] and v ∈ [∈ 1,2] and v [0,1] when |u|=1.

FIG. 7G provides an example of filter pattern 710 using only 4 samples for the filtering. This pattern enable further reducing the number of bits used in the summing operations by one, compared to pattern in FIG. 7F. It then allows to reduce by three bits compared to pattern in FIG. 4A. With that filter pattern, the filtering operations become:

$$O_{(x_c,y_c)}^{Cb} = f_0^{Cb} \cdot I_{(x,y)} + f_1^{Cb} \cdot I_{(x+1,y)} + f_2^{Cb} \cdot I_{(x,y+1)} + f_3^{Cb} \cdot I_{(x+1,y+1)}$$

This selection of samples can be described as each sample having a position (x+u, y+v) relative to the reference sample where both u and v belong to [0,1].

In some other variants, the cost of the addition is essentially zero. The multiplication inputs are limited so that the multiplication output/result is a signed number on 16 bits (i.e. 15 precision bits plus 1 sign bit). Then, if 10 bits are used for sample values, coefficient values are limited in a given range, with a given precision, so that they can be expressed on 5 bits plus one sign bit. In some of these variants, the multiplication operations are performed on 16 bits registers.

In one embodiment, the decimal precision of the coefficients is signalled in the bitstream, for instance in a parameter set (e.g. APS, SPS or PPS), or in the slice header, as a first precision information.

In one embodiment, the range (or an index in a set of possible ranges) of coefficients is signalled in the bitstream, for instance in a parameter set (e.g. APS, SPS or PPS), or in the slice header, as a second precision information.

In one embodiment, the number of kept bits for sample values (i.e. KB) or alternatively the number of dead bits (i.e. DB) is signalled in the bitstream, for instance in a parameter set (e.g. APS, SPS or PPS), or in the slice header, as a third precision information.

In one embodiment, a combination of any one of the first, second and/or third precision information is signalled in the bitstream, for instance in a parameter set (e.g. APS, SPS or PPS), or in the slice header.

In one variant, the allowed values of such combination of anyone of the first, second and/or third precision information which are signalled in the bitstream shall guarantee a worst case for which the multiplication operation can be computed using a fixed maximum number of bits, for instance 16. In an alternative the worst case also considers the maximum number of bits used during the addition operation.

In one embodiment, an index in a set of the possible values for the combination of anyone of the first, second and/or third precision information is signalled.

In one variant such sets are defined in order to guarantee a worst case for which the multiplication operation can be computed using a fixed maximum number of bits, for instance 16. In an alternative the worst case also considers the maximum number of bits used during the addition operation.

In an alternative to embodiments where the combination of anyone of the first, second and/or third precision information, includes the first and the second precision information, (i.e. the decimal precision and the kept range) an alternative is to signal a mantissa size (in number of bits) and a fixed exponent of a floating point representation.

In one alternative, instead of using fixed point representation for the filter coefficients, a specific floating point representation is used, which guarantees to be computed using limited number of bits operations. In other words, the combination of anyone of the first, second and/or third precision information is signalled for each coefficient index.

It is understood that in the described examples, variants and/or embodiments, depending on the used bit-depth and precision of the sample values, the coefficients ranges could be shifted up and/or down (i.e. multiplied by a power of two), while shifting the lowest bits of representation of the coefficients by the same amount (to keep the same precision), in order to provide an equivalent mathematical result. I.e. the [range of] coefficient value, (or the sample values) is scaled by the inverse amount of any sample value (or [range of] coefficient value) scaling:

$$f'^{Cb}_{(u_i,v_1)} \cdot I_{(x+u_i,y+v_i)} = a \cdot f'^{Cb}_{(u_i,v_1)} \cdot I_{(x+u_i,y+v_i)} \cdot \frac{1}{a} = \frac{1}{b} \cdot f''^{Cb}_{(u_i,v_1)} \cdot I_{(x+u_i,y+v_i)} \cdot b. \quad (22)$$

This is the same with bitwise shifts, as a left bitwise shift by B is equivalent to a multiplication by $2^B$ and a right shift is roughly equivalent to a integer division by $2^B$ (difference is that for negative number the rounding is toward minus infinity for left shift while it is toward 0 for integer division).

enabling or disabling CCALF per Chroma component in a slice. When CCALF is enabled in a slice (i.e. CCLAF is enabled on at least one Chroma component), for each Chroma component on which CCALF is enabled, a ccalf_ctb_flag_cb[x][y] (for Cb component) or a ccalf_ctb_flag_cr[x][y] (for Cr component) flag is encoded in the CTU data of each CTU of the slice, with x,y the horizontal and vertical CTU coordinates/index in the picture. The flags enable signalling if CCALF is enabled or disabled in the Chroma CTB. When CCALF is enabled in a Chroma CTB, Chroma samples are corrected/filtered via CCALF using the CTB Luma samples (for example, as discussed above).

The flags are signalled using CABAC (Context Adaptive Binary Arithmetic Coding), with 3 CABAC contexts per Chroma component. For a given Chroma component with index componentIdx, a context is selected by counting the number of ccalf_ctb_flag_cb (for Cb component) or a ccalf_ctb_flag_cr (for Cr component) that are active in top ([x][y−1]) and left ([x−1][y]) CTU belonging to the same slice (when they exist/are available), and using that value as context index.

An example of ccalf_ctb_flag_cb[x][y] and ccalf_ctb_flag_cr[x][y] signalling is given in Table 1, using the same notation and convention as in Versatile Video Coding (Draft 5) corresponding to VTM-5.0.

TABLE 1

| coding_tree_unit( ) syntax | |
|---|---|
| | Descriptor |
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag I I slice_sao_chroma_flag ) | |
|     sao( xCtb >> CtbLog2SizeY, yCtb >> CtbLog2SizeY ) | |
|   if( slice_alf_enabled_flag ){ | |
|     ... | |
|   } | |
|   if( slice_ccalf_enable_flag_cb ) | |
|     ccalf_ctb_flag_cb[ xCtb >> CtbLog2SizeY ][ yCtb >> CtbLog2SizeY ] | ae(v) |
|   if( slice_ccalf_enable_flag_cr ) | |
|     ccalf_ctb_flag_cr[ xCtb >> CtbLog2SizeY ][ yCtb >> CtbLog2SizeY ] | ae(v) |
|   if( slice_type = = I && qtbtt_dual_tree_intra_flag ) | |
|     dual_tree_implicit_qt_split ( xCtb, yCtb, CtbSizeY, 0 ) | |
|   else | |
|     coding_tree( xCtb, yCtb, CtbSizeY, CtbSizeY, 1, 1, 0, 0, 0, 0, 0, | |
|       SINGLE_TREE, MODE_TYPE_ALL ) | |
| } | |

It should also be appreciated that while the simplification of the bitwise representation of the sample values and/or filter coefficients have been performed 'during filtering' via the above bitwise operations, it would also be possible to pre-process these values separately prior to filtering.

Signalling

Input CCALF parameters 305 and 306 in FIG. 3 may include flags for enabling/disabling CCALF at different granularity levels. An example of the signalling of the flags is provided below.

In certain embodiments, one flag is signalled in a parameter set: a Sequence Parameter Set (SPS) or a Picture Parameter Set (PPS) for instance. This flag enables activating or not the CCALF tool at sequence level or picture level. When CCALF tool is active in a picture, one flag is signalled per Chroma component in the slice header. It enables According to an embodiment, in order to be able to adapt and transmit filter coefficients specifically for a slice, and as conventionally performed with slice parameters, coefficients of CCALF filters are signalled in the slice header. If the CCALF is indicated as active for a given Chroma component, each coefficient of the corresponding filter is sequentially encoded/decoded in/from the bitstream.

Coefficients of CCALF are typically coded using Golomb variable length codes. However, when implementing the reduction in bits representing the coefficients discussed above, the coding can be simplified. Specifically, since the number of bits for storing the coefficient values is reduced, it is possible to use coding method that is simpler to parse without loss of coding efficiency.

In particular, Golomb coding requires signalling of a 'tuneable parameter' (M) in order to correctly decode the coefficient; this adds to the bitstream overhead. The present invention relates to directly signalling the coefficients in the slice header without reference to any other parameter. In other words, the coefficients are encoded using a fixed representation (i.e. without reference to a 'tuneable parameter'). This may be described as being 'prefix-free' or 'comma-free' in that the codeword is a single element without a delimiter (either inferred or explicitly coded).

In a first alternative, which is especially suited when combining first and second variants discussed above, the used/significant bits of the coefficient values are stored as this in the bitstream without any compression (i.e. a fixed number of bits to represent the code, whatever the value is). As an example, if coefficients are represented as in FIG. 5C, the coefficient can be stored on three bits in the bitstream: the sign bit followed by the two decimal precision bits, for instance.

In a second alternative, a kind of signed unary coding is used to reduce the cost of low amplitude coefficients. A first bit in the bitstream indicates if the coefficient is zero or not, then if the coefficient is not zero; a bit indicates the sign of the coefficient, then a sequence of bits equal to one indicates the amplitude of the coefficient. The number of bits equal to one is equal to the absolute value, minus one, of 'the integer representation of the coefficient'. The integer representation of the coefficient is the integer value that is represented by the bits of the integer number in 503. 'Minus one' is used, because equality to zero information is already coded. Then, if the absolute value is lower than a maximum possible/authorized value, a bit equal to zero indicates the end of the signalling of the number. It corresponds to a unary coding of the absolute value, minus one. The decoding process for this representation can be summarized by the algorithm described in Table 2,

TABLE 2 coefficient decodind algorithm of second alternative

```
decode_ccalf_coefficient( ) {
    if ( read_one_bit( ) )
        return 0
    sign = read_one_bit( )
    max_val = CCALF_MAX_COEFF_VALUE
    if ( sign )
        max_val = – CCALF_MIN_COEFF_VALUE
    abs_val = 1
    while ( abs_val < max_val && read_one_bit( ) )
        abs_val += 1
    if ( sign )
        return – abs_va
l
```

TABLE 2-continued coefficient decodind algorithm of second alternative

```
        return abs_val
    }
```

In some alternatives where an asymmetric range of possible coefficient values is used, the maximum possible/authorized value of the number is different for negative numbers and for positive numbers, as is can be the case in Table 2, when 'CCALF_MAX_COEFF_VALUE' is not equal to '–CCALF_MIN_COEFF_VALUE'. For instance, if representation of FIG. 5C is used, and if the range of possible coefficient values is [–0.03125;0.03125[ (i.e. [–0.03125; 0.0234375]), the maximum possible/authorized value is 4 for negative numbers (as –0.03125 is represented by the integer number –4) and 3 for positive number (as 0.0234375 is represented by the integer number 3). In that example, the first bit equal to one means that the number is zero, and the sign bit equal to one means the number is negative. The representation of the coefficients in the bitstream are then: '01111' (i.e. –4=CCALF_MIN_COEFF_VALUE) for –0.03125, '01110' (i.e. –3) for –0.0234375, '0110' (i.e. –2) for –0.015625, '010' (i.e. –1) for –0.0078125, '1' for 0.0, '000' (i.e. 1) for 0.0078125, '0010' (i.e. 2) for 0.015625, and '0011' (i.e. 3=CCALF_MAX_COEFF_VALUE) for 0.0234375. In some alternatives, the first bit equal to one could mean that the number is non zero. In some alternatives, the sign bit equal to one could mean that the number is positive. In some alternatives, the unary coding of a number could be a sequence of bits equal to 0 followed by a bit equal to 1 (if the number is lower than the maximum).

In a third alternative, the bitstream first provides the unary coding of the integer representation to the absolute value of the coefficient. If it is non-zero, a sign bit follows it. The algorithm in Table 3 describes an example of decoding process for this representation. In this third alternative, the sign is not known before decoding the absolute value of the coefficient. The maximum value used for unary coding is then the same for positive and negative values (CCALF_MAX_COEFF_ABSOLUTE_VALUE in Table 3). As an example, the representation of FIG. 5C is used with a range of possible coefficient values set equal to [–0.0234375; 0.0234375] (i.e CCALF_MAX_COEFF_ABSOLUTE_VALUE=3). The representation of the coefficients in the bitstream are then: '1111' (i.e. –3) for –0.0234375, '1101' (i.e. –2) for –0.015625, '101' (i.e. –1) for –0.0078125, '0' for 0.0, '100' (i.e. 1) for 0.0078125, '1100' (i.e. 2) for 0.015625, and '1110' (i.e. 3) for 0.0234375.

TABLE 3 coefficient decodind algorithm of third alternative

```
decode_ccalf_coefficient( ) {
    abs_val = 0
    while ( abs_val < CCALF_MAX_COEFF_ABSOLUTE_VALUE && read_one_bit( ) )
        abs_val += 1
    if ( abs_val > 0 && read_one_bit( ) )
        return – abs_val
    return abs_val
}
```

In some variants, the coefficients of CCALF filters are signalled in an APS (or another parameter set). When slice_ccalf_enable_flag_cb is equal to one in slice header, the slice header also provides the APS (or other parameter set) index/identifier of the APS (or other parameter set) in which filter coefficients of CCALF filter have to be retrieved for Cb Chroma component. When slice_ccalf_enable_flag_cr is equal to one in slice header, the slice header also provides the APS (or other parameter set) index of the APS (or other parameter set) in which filter coefficients of CCALF filter have to be retrieved for Cr Chroma component. When using a filter pattern such as illustrated in FIG. 4A, the number of filter coefficient present in the bitstream is smaller than the number of samples used in the filter shape, as some coefficients are shared with several sample positions.

Implementation of embodiments of the invention

One or more of the foregoing embodiments may be implemented in the form of an encoder or a decoder, which performs the method steps of the one or more foregoing embodiments. Following embodiments illustrate such implementations.

Figure 8:
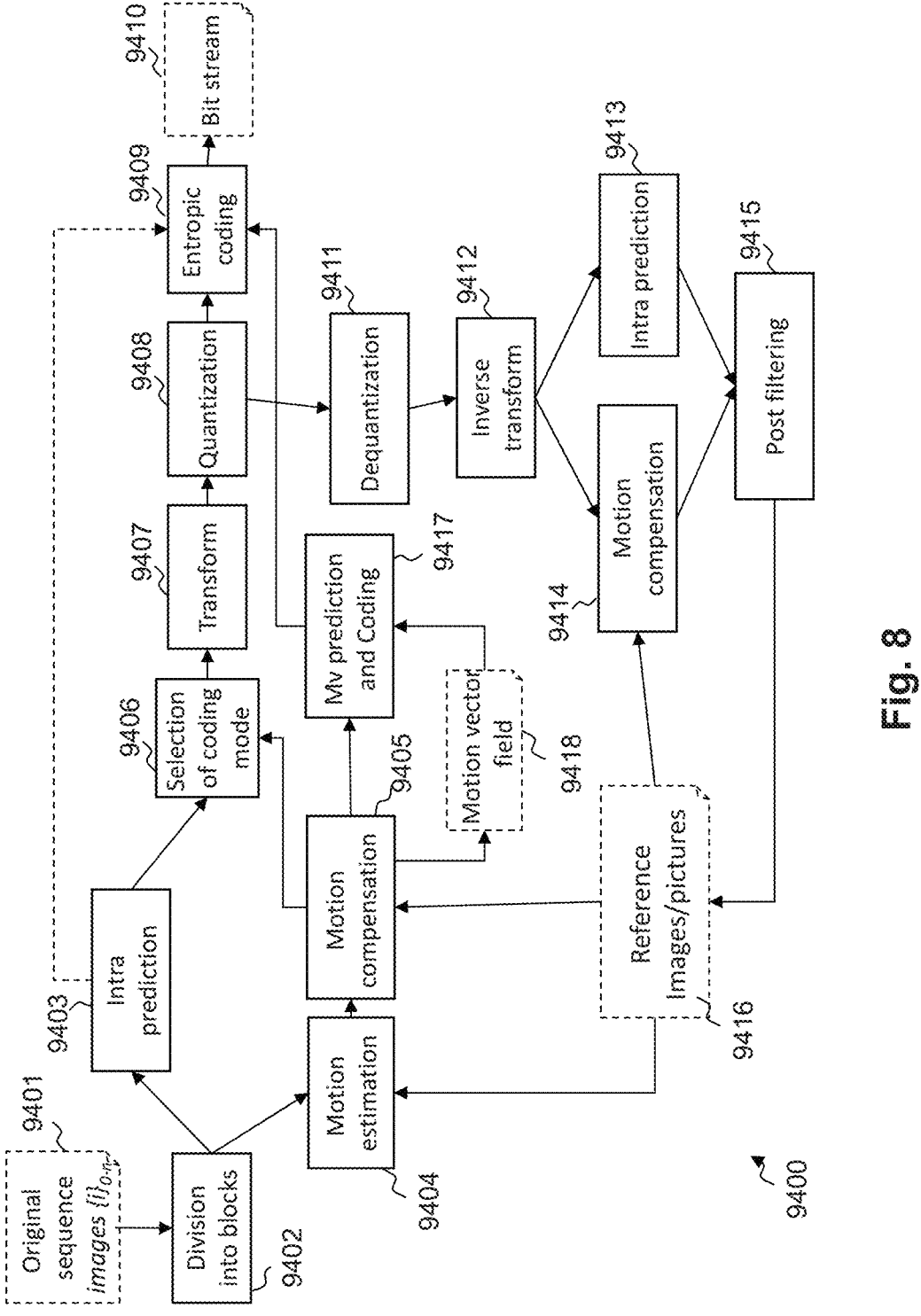
FIG. 8 is a flow chart illustrating steps of an encoding method according to embodiments of the invention.
Figure 9:
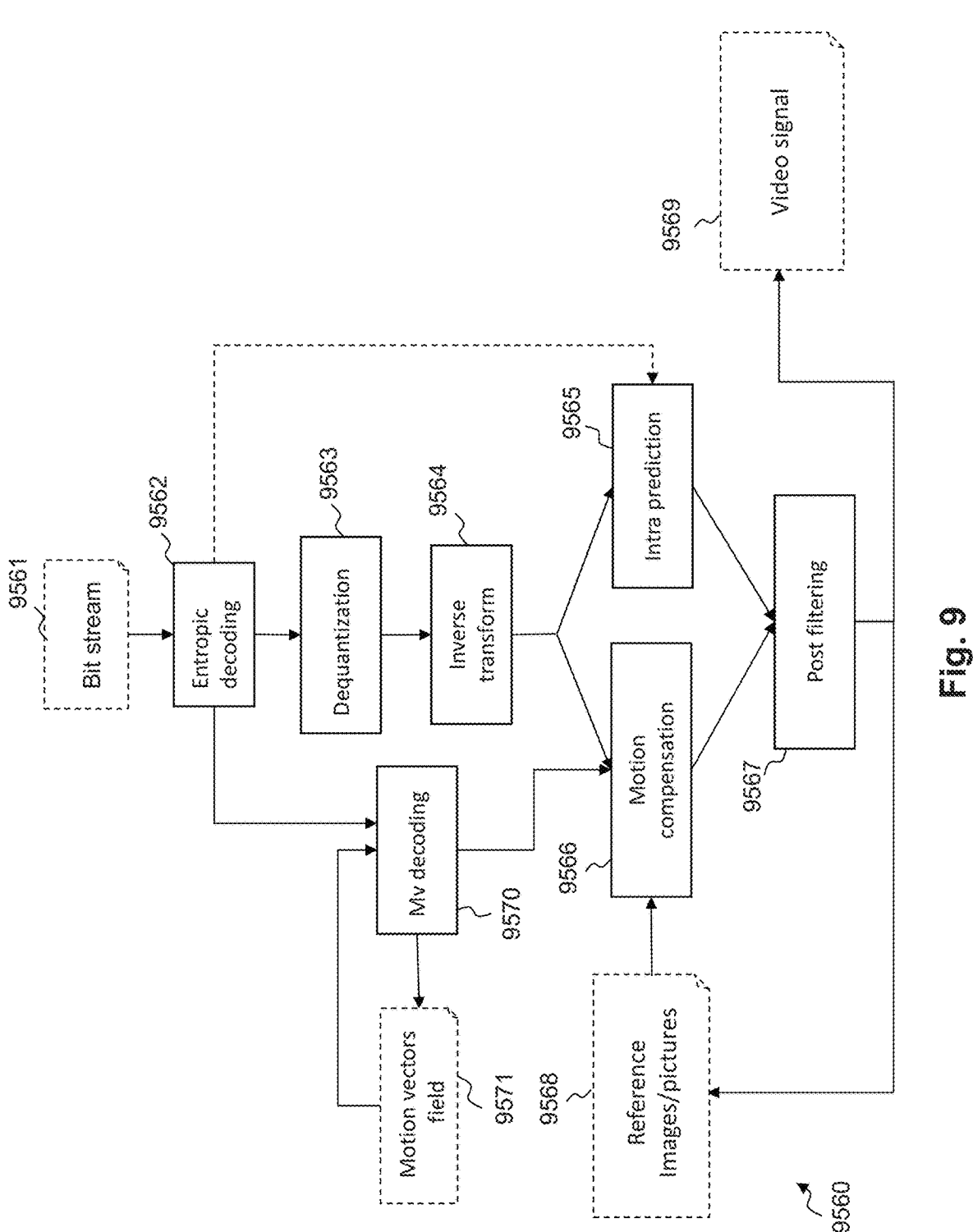
FIG. 9 is a flow chart illustrating steps of a decoding method according to embodiments of the invention.

For example, an Adaptive Loop Filter according to any of the foregoing embodiments may be used in a post filtering 9415 performed by an encoder in FIG. 8 or a post filtering 9567 performed by a decoder in FIG. 9.

FIG. 8 illustrates a block diagram of an encoder according to an embodiment of the invention. The encoder is represented by connected modules, each module being adapted to implement, for example in the form of programming instructions to be executed by a Central Processing Unit (CPU) of a device, at least one corresponding step of a method implementing at least one embodiment of encoding an image of a sequence of images according to one or more embodiments of the invention.

An original sequence of digital images i0 to in 9401 is received as an input by the encoder 9400. Each digital image is represented by a set of samples, sometimes also referred to as pixels (hereinafter, they are referred to as pixels). A bitstream 9410 is output by the encoder 9400 after implementation of the encoding process. The bitstream 9410 comprises data for a plurality of encoding units or image portions such as slices, each slice comprising a slice header for transmitting encoding values of encoding parameters used to encode the slice and a slice body, comprising encoded video data.

The input digital images i0 to in 9401 are divided into blocks of pixels by a module 9402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, MERGE, SKIP). The possible coding modes are tested.

Module 9403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

A temporal prediction is implemented by a motion estimation module 9404 and a motion compensation module 9405. Firstly a reference image from among a set of reference images 9416 is selected, and a portion of the reference image, also called reference area or image portion, which is the closest area (closest in terms of pixel value similarity) to the given block to be encoded, is selected by the motion estimation module 9404. The motion compensation module 9405 then predicts the block to be encoded using the selected area. The difference between the selected reference area and the given block, also called a residual block/data, is computed by the motion compensation module 9405. The selected reference area is indicated using a motion information (e.g. a motion vector).

Thus, in both cases (spatial and temporal prediction), a residual is computed by subtracting the predictor from the original block when it is not in the SKIP mode.

In the INTRA prediction implemented by the module 9403, a prediction direction is encoded. In the Inter prediction implemented by the modules 9404, 9405, 9416, 9418, 9417, at least one motion vector or information (data) for identifying such motion vector is encoded for the temporal prediction.

Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 9418 by a motion vector prediction and coding module 9417.

The encoder 9400 further comprises a selection module 9406 for selecting a coding mode by applying an encoding cost criterion, such as a rate-distortion criterion. In order to further reduce redundancies, a transform (such as DCT) is applied by a transform module 9407 to the residual block, and the transformed data obtained is then quantized by a quantization module 9408 and entropy encoded by an entropy encoding module 9409. Finally, the encoded residual block of the current block being encoded is inserted into the bitstream 9410 when it is not in the SKIP mode and the selected coding mode requires encoding of the residual block.

The encoder 9400 also performs decoding of the encoded image in order to produce a reference image (e.g. those in the Reference images/pictures 9416) for the motion estimation of the subsequent images. This enables the encoder and a decoder receiving the bitstream to have the same reference frames (e.g. reconstructed images or reconstructed image portions are used). An inverse quantization ("dequantization") module 9411 performs an inverse quantization ("dequantization") of the quantized data, which is then followed by an inverse transform performed by an inverse transform module 9412. An intra prediction module 9413 uses prediction information to determine which predictor to use for a given block and a motion compensation module 9414 actually adds the residual obtained by the module 9412 to the reference area obtained from the set of reference images 9416. Post filtering is then applied by a module 9415 to filter the reconstructed frame (image or image portions) of pixels to obtain another reference image for the set of reference images 9416.

FIG. 9 illustrates a block diagram of a decoder 9560 which may be used to receive data from an encoder according an embodiment of the invention. The decoder is represented by connected modules, each module being adapted to implement, for example in the form of programming instructions to be executed by a CPU of device, a corresponding step of a method implemented by the decoder 9560.

The decoder 9560 receives a bitstream 9561 comprising encoded units (e.g. data corresponding to an image portion, a block or a coding unit), each one being composed of a header containing information on encoding parameters and a body containing the encoded video data. As explained with respect to FIG. 8, the encoded video data is entropy encoded, and the motion information (e.g. motion vector predictors' indexes) are encoded, for a given image portion (e.g. a block or a CU), on a predetermined number of bits. The received encoded video data is entropy decoded by a module 9562. The residual data is then dequantized by module 9563 and then an inverse transform is applied by a module 9564 to obtain pixel values.

The mode data indicating the coding mode are also entropy decoded and based on the mode, an INTRA type decoding or an INTER type decoding is performed on the encoded blocks (units/sets/groups) of image data. In the case of INTRA mode, an INTRA predictor is determined by an intra prediction module 9565 based on the intra prediction mode specified in the bitstream (e.g. the intra prediction mode is determinable using data provided in the bitstream). If the mode is INTER mode, the motion prediction information is extracted/obtained from the bitstream so as to find (identify) the reference area used by the encoder. The motion prediction information comprises the reference frame index and the motion vector residual, for example. The motion vector predictor is added to the motion vector residual by a motion vector decoding module 9570 in order to obtain the motion vector.

The motion vector decoding module 9570 applies motion vector decoding for each image portion (e.g. current block or CU) encoded by motion prediction. Once an index of the motion vector predictor for the current block has been obtained, the actual value of the motion vector associated with the image portion (e.g. current block or CU) can be decoded and used to apply motion compensation by a module 9566. The reference image portion indicated by the decoded motion vector is extracted/obtained from a set of Reference images 9568 so that the module 9566 can perform the motion compensation. Motion vector field data 9571 is updated with the decoded motion vector in order to be used for the prediction of subsequently decoded motion vectors.

Finally, a decoded block is obtained. Where appropriate, post filtering is applied by a post filtering module 9567. A decoded video signal 9569 is finally obtained and provided by the decoder 9560.

Figure 10:
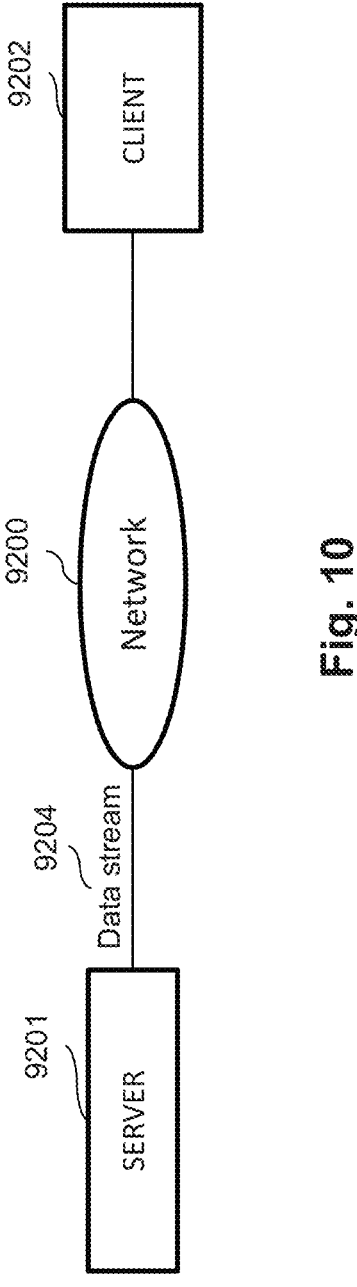
FIG. 10 is a block diagram schematically illustrating a data communication system in which one or more embodiments of the invention may be implemented.

FIG. 10 illustrates a data communication system in which one or more embodiments of the invention may be implemented. The data communication system comprises a transmission device, in this case a server 9201, which is operable to transmit data packets of a data stream 9204 to a receiving device, in this case a client terminal 9202, via a data communication network 9200. The data communication network 9200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 9201 sends the same data content to multiple clients.

The data stream 9204 provided by the server 9201 may be composed of multimedia data representing video and audio data. Audio and video data streams may, in some embodiments of the invention, be captured by the server 9201 using a microphone and a camera respectively. In some embodiments data streams may be stored on the server 9201 or received by the server 9201 from another data provider, or generated at the server 9201. The server 9201 is provided with an encoder for encoding video and audio streams in particular to provide a compressed bitstream for transmission that is a more compact representation of the data presented as input to the encoder. In order to obtain a better ratio of the quality of transmitted data to quantity of transmitted data, the compression of the video data may be for example in accordance with the High Efficiency Video Coding (HEVC) format or H.264/Advanced Video Coding (AVC) format or Versatile Video Coding (VVC) format. The client 9202 receives the transmitted bitstream and decodes the reconstructed bitstream to reproduce video images on a display device and the audio data by a loud speaker.

Although a streaming scenario is considered in this embodiment, it will be appreciated that in some embodiments of the invention the data communication between an encoder and a decoder may be performed using for example a media storage device such as an optical disc. In one or more embodiments of the invention a video image may be transmitted with data representative of compensation offsets for application to reconstructed pixels of the image to provide filtered pixels in a final image.

Figure 11:
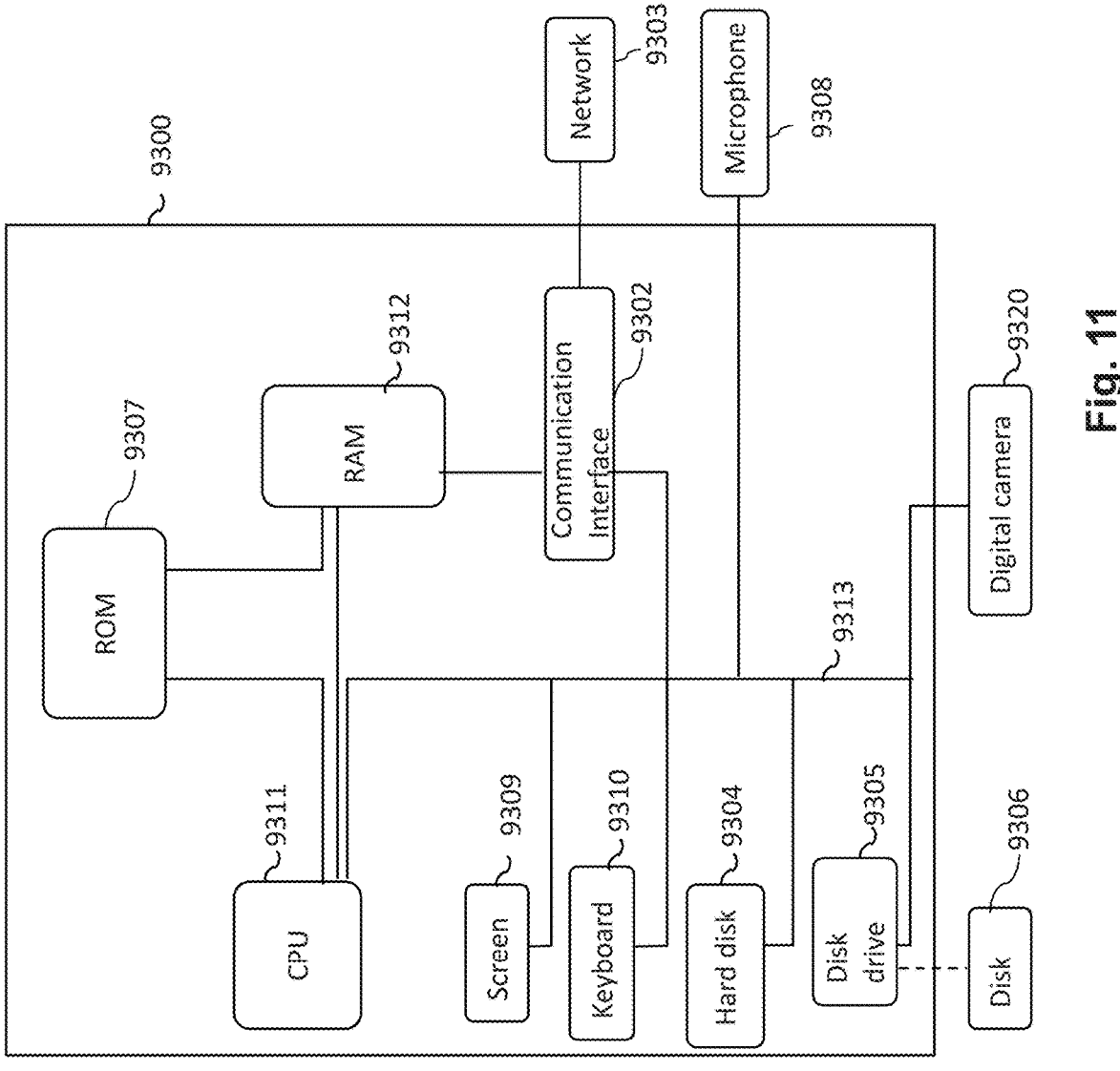
FIG. 11 is a block diagram illustrating components of a processing device in which one or more embodiments of the invention may be implemented.

FIG. 11 schematically illustrates a processing device 9300 configured to implement at least one embodiment of the invention. The processing device 9300 may be a device such as a micro-computer, a workstation, a user terminal or a light portable device. The device/apparatus 9300 comprises a communication bus 9313 connected to:

a central processing unit 9311, such as a microprocessor, denoted CPU;

a read only memory 9307, denoted ROM, for storing computer programs/instructions for operating the device 9300 and/or implementing the invention;

a random access memory 9312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 9302 connected to a communication network 9303 over which digital data to be processed are transmitted or received.

Optionally, the apparatus 9300 may also include following components:

a data storage means 9304 such as a hard disk, for storing computer programs for implementing methods of one or more embodiments of the invention and data used or produced during the implementation of one or more embodiments of the invention;

a disk drive 9305 for a disk 9306 (e.g. a storage medium), the disk drive 9305 being adapted to read data from the disk 9306 or to write data onto said disk 9306; or a screen 9309 for displaying data and/or serving as a graphical interface with a user, by means of a keyboard 9310, a touchscreen or any other pointing/input means.

The apparatus 9300 can be connected to various peripherals, such as for example a digital camera 9320 or a microphone 9308, each being connected to an input/output card (not shown) so as to supply multimedia data to the apparatus 9300.

The communication bus 9313 provides communication and interoperability between the various elements included in the apparatus 9300 or connected to it. The representation of the bus is not limiting and in particular the central processing unit 9311 is operable to communicate instructions to any element of the apparatus 9300 directly or by means of another element of the apparatus 9300.

The disk 9306 can be replaced by any information medium such as for example a compact disk (CD-ROM), rewritable or not, a ZIP disk or a memory card and, in general terms, by an information storage means that can be read by a microcomputer or by a processor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 9307, on the hard disk 9304 or on a removable digital medium such as for example a disk 9306 as described previously. According to a variant, the executable code of the programs can be received by means of the communication network 9303, via the interface 9302, in order to be stored in one of the storage means of the apparatus 9300 before being executed, for example in the hard disk 9304.

The central processing unit 9311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 9304, the disk 9306 or in the read only memory 9307, are transferred into the random access memory 9312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

It is also understood that according to other embodiments of the present invention, a decoder according to an aforementioned embodiment is provided in a user terminal such as a computer, a mobile phone (a cellular phone), a tablet or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such embodiments are provided below with reference to FIGS. 12 and 13.

Figure 12:
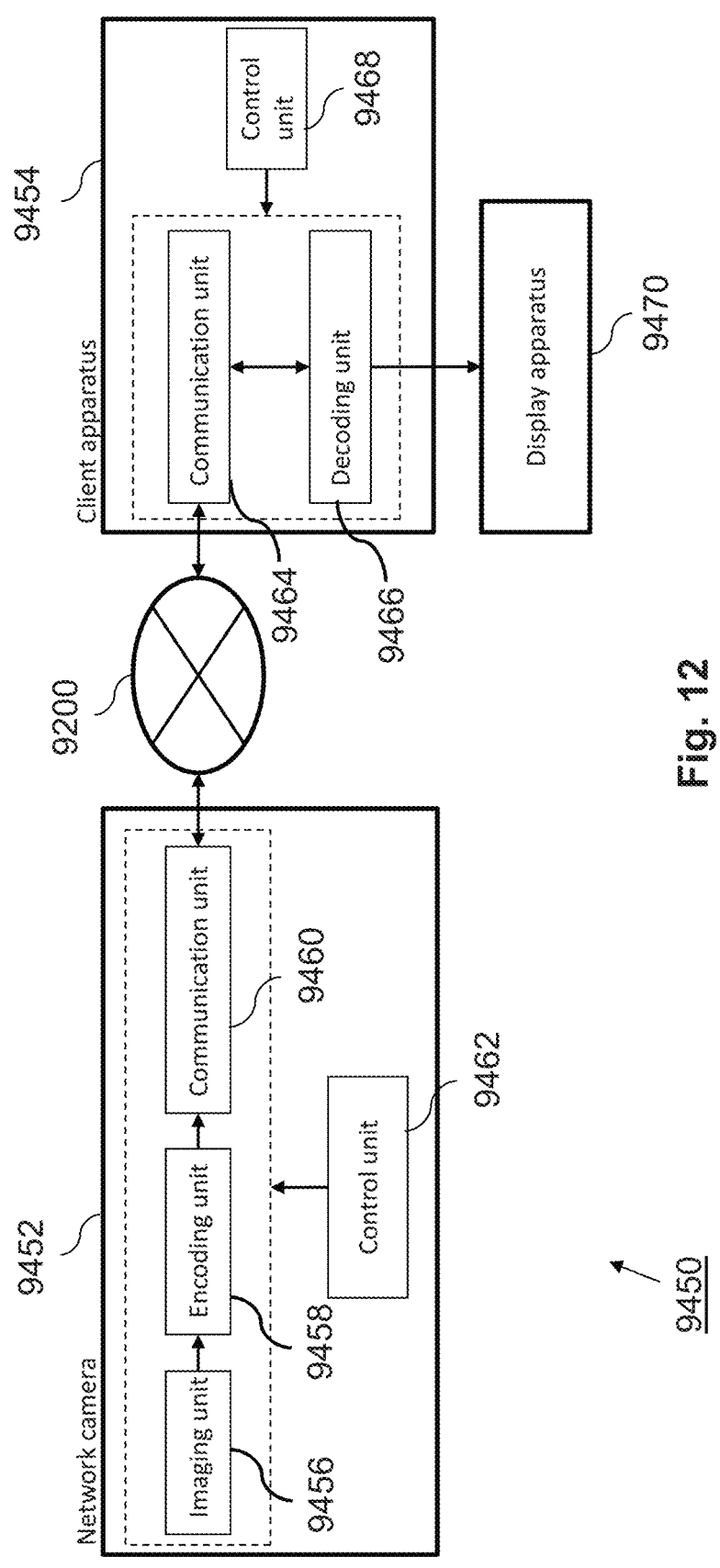
FIG. 12 is a diagram illustrating a network camera system in which one or more embodiments of the invention may be implemented.

FIG. 12 is a diagram illustrating a network camera system 9450 comprising a network camera 9452 and a client apparatus 9454.

The network camera 9452 comprises an imaging unit 9456, an encoding unit 9458, a communication unit 9460, and a control unit 9462. The network camera 9452 and the client apparatus 9454 are mutually connected to be able to communicate with each other via the network 9200. The imaging unit 9456 comprises a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully. The encoding unit 9458 encodes the image data by using said encoding methods explained in one or more of the foregoing embodiments. The encoding unit 9458 uses at least one of encoding methods explained in the foregoing embodiments. For another instance, the encoding unit 9458 can use combination of encoding methods explained in the foregoing embodiments.

The communication unit 9460 of the network camera 9452 transmits the encoded image data encoded by the encoding unit 9458 to the client apparatus 9454. Further, the communication unit 9460 may also receive commands from client apparatus 9454. The commands comprise commands to set parameters for the encoding by the encoding unit 9458. The control unit 9462 controls other units in the network camera 9452 in accordance with the commands received by the communication unit 9460 or user input.

The client apparatus 9454 comprises a communication unit 9464, a decoding unit 9466, and a control unit 9468. The communication unit 9464 of the client apparatus 9454 may transmit commands to the network camera 9452. Further, the communication unit 9464 of the client apparatus 9454 receives the encoded image data from the network camera 9452. The decoding unit 9466 decodes the encoded image data by using said decoding methods explained in one or more of the foregoing embodiments. For another instance, the decoding unit 9466 can use combination of decoding methods explained in the foregoing embodiments. The control unit 9468 of the client apparatus 9454 controls other units in the client apparatus 9454 in accordance with the user operation or commands received by the communication unit 9464. The control unit 9468 of the client apparatus 9454 may also control a display apparatus 9470 so as to display an image decoded by the decoding unit 9466.

The control unit 9468 of the client apparatus 9454 may also control the display apparatus 9470 so as to display GUI (Graphical User Interface) to designate values of the parameters for the network camera 9452, for example of the parameters for the encoding by the encoding unit 9458. The control unit 9468 of the client apparatus 9454 may also control other units in the client apparatus 9454 in accordance with user operation input to the GUI displayed by the display apparatus 9470. The control unit 9468 of the client apparatus 9454 may also control the communication unit 9464 of the client apparatus 9454 so as to transmit commands to the network camera 9452 which designate values of the parameters for the network camera 9452, in accordance with the user operation input to the GUI displayed by the display apparatus 9470.

Figure 13:
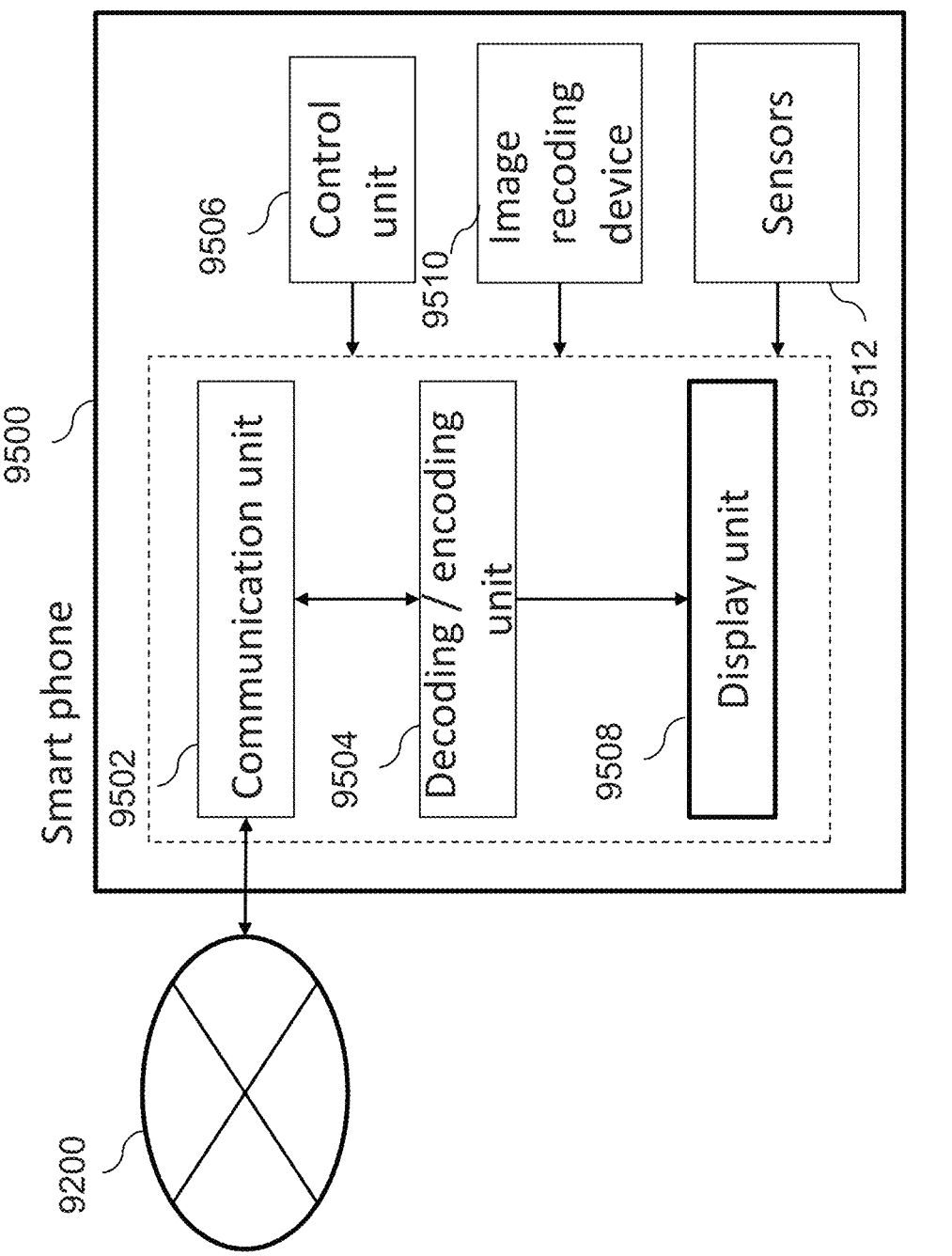
FIG. 13 is a diagram illustrating a smart phone in which one or more embodiments of the invention may be implemented.

FIG. 13 is a diagram illustrating a smart phone 9500. The smart phone 9500 comprises a communication unit 9502, a decoding/encoding unit 9504, a control unit 9506, and a display unit 9508.

The communication unit 9502 receives the encoded image data via network 9200. The decoding/encoding unit 9504 decodes the encoded image data received by the communication unit 9502. The decoding/encoding unit 9504 decodes the encoded image data by using said decoding methods explained in one or more of the foregoing embodiments. The decoding/encoding unit 9504 can also use at least one of encoding or decoding methods explained in the foregoing embodiments. For another instance, the decoding/encoding unit 9504 can use a combination of decoding or encoding methods explained in the foregoing embodiments.

The control unit 9506 controls other units in the smart phone 9500 in accordance with a user operation or commands received by the communication unit 9502. For example, the control unit 9506 controls a display unit 9508 so as to display an image decoded by the decoding/encoding unit 9504.

The smart phone may further comprise an image recording device 9510 (for example a digital camera and an associated circuitry) to record images or videos. Such recorded images or videos may be encoded by the decoding/encoding unit 9504 under instruction of the control unit 9506. The smart phone may further comprise sensors 9512 adapted to sense the orientation of the mobile device. Such sensors could include an accelerometer, gyroscope, compass, global positioning (GPS) unit or similar positional sensors. Such sensors 9512 can determine if the smart phone changes orientation and such information may be used when encoding a video stream.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, e.g. a flag or information indicative of the result, so that the indicated or determined/inferred result can be used in the processing instead of actually performing the comparison, determination, assessment, selection, execution, performing, or consideration, e.g. during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Reference numerals appearing in the claims are by way of illustration only and shall have no limiting effect on the scope of the claims.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The invention claimed is:

1. A method of decoding an image portion encoded using Cross-Component Adaptive Loop Filter (CCALF), the method comprising:
   determining if CCALF is indicated for a given component;
   decoding CCALF coefficients from a bitstream; and
   decoding said image portion using said CCALF coefficients,
   wherein said CCALF coefficients are each represented by a fixed number of bits in the bitstream,
   wherein possible values of said filter coefficients are restricted to a range represented by values of powers of two defined by the fixed number of bits,
   wherein a possible value of each filter coefficient has been restricted to any one of zero and values of powers of two represented by the fixed number of bits, and
   wherein the fixed number of bits is lower than the number of bits defined by bit depth.

2. The method according to claim 1, wherein a fixed number of bits to represent each filter coefficient and/or first component sample value is so that the filter output can be represented on 16 or fewer bits.

3. The method according to claim 1, further comprising combining said cross-component filter output with an output of a filter corresponding to a different component.

4. The method according to claim 3, wherein said first component is Luma and the different component is a Chroma component.

5. The method according to claim 1, wherein the method comprises inputting a difference value between said first component sample value and a reference sample value into the Cross-Component Adaptive Loop Filter.

6. The method according to claim 1, wherein restricting a possible value comprises determining an absolute value for a filter coefficient from a fixed number of bits used to represent said filter coefficient.

7. The method according to claim 1, wherein a possible value of each filter coefficient has been restricted using a reduced fixed-point decimal precision of the filter coefficient value.

8. The method according to claim 7, wherein the reduced fixed-point decimal precision is 7 bits.

9. The method according to claim 1, wherein a filter operation comprises a multiplication of sample values and a filter coefficient, and said multiplication is implemented via a bitwise shift and/or combination with another filter coefficient so as to replace said multiplication operation by bitwise shift and addition operations.

10. The method according to claim 1, wherein said determining if CCALF is indicated for a given component comprises decoding a flag.

11. The method according to claim 1, wherein each fixed number of bits comprises:
a bit indicating the sign of a coefficient; and
a series of bits indicating an amplitude of the coefficient.

12. The method according to claim 1, wherein each fixed number of bits comprises:
at least one bit in the bitstream indicating if a coefficient is zero or not, and if the coefficient is not zero a bit indicating the sign of the coefficient.

13. The method according to claim 12, wherein each fixed number of bits comprises:
if the coefficient is not zero, a sequence of bits equal to one indicating an amplitude of the coefficient.

14. The method according to claim 12, wherein said at least one bit being equal to one indicates that the coefficient is zero.

15. The method according to claim 12, the sign bit equal to one indicates that the coefficient is negative.

16. A decoder for decoding an image portion encoded using Cross-Component Adaptive Loop Filter (CCALF), the decoder comprising:
means for determining if CCALF is indicated for a given component;
means for decoding CCALF coefficients from a bitstream; and
means for decoding said image portion using said CCALF coefficients,
wherein said CCALF coefficients are each represented by a fixed number of bits in the bitstream,
wherein possible values of said filter coefficients are restricted to a range represented by values of powers of two defined by the fixed number of bits,
wherein a possible value of each filter coefficient has been restricted to any one of zero and values of powers of two represented by the fixed number of bits, and
wherein the fixed number of bits is lower than the number of bits defined by bit depth.

17. A non-transitory computer readable storage medium storing a program for causing a computer to execute a method of decoding an image portion encoded using Cross-Component Adaptive Loop Filter (CCALF), the method comprising:
determining if CCALF is indicated for a given component;
decoding CCALF coefficients from a bitstream; and
decoding said image portion using said CCALF coefficients,
wherein said CCALF coefficients are each represented by a fixed number of bits in the bitstream,
wherein possible values of said filter coefficients are restricted to a range represented by values of powers of two defined by the fixed number of bits,
wherein a possible value of each filter coefficient has been restricted to any one of zero and values of powers of two represented by the fixed number of bits, and
wherein the fixed number of bits is lower than the number of bits defined by bit depth.

\* \* \* \* \*